(12) United States Patent
Murakami et al.

(10) Patent No.: US 10,899,893 B2
(45) Date of Patent: Jan. 26, 2021

(54) AMINOSILANE-MODIFIED COLLOIDAL SILICA DISPERSION AND METHOD OF MANUFACTURING SAME

(71) Applicants: NISSAN CHEMICAL INDUSTRIES, LTD., Tokyo (JP); NIIGATA UNIVERSITY, Niigata (JP)

(72) Inventors: Natsumi Murakami, Sodegaura (JP); Masahiro Hida, Sodegaura (JP); Norio Tsubokawa, Niigata (JP); Takeshi Yamauchi, Niigata (JP); Tomoya Maeta, Sodegaura (JP)

(73) Assignees: NISSAN CHEMICAL INDUSTRIES, LTD., Tokyo (JP); NIIGATA UNIVERSITY, Niigata (JP)

( * ) Notice: Subject to any disclaimer, the term of this patent is extended or adjusted under 35 U.S.C. 154(b) by 125 days.

(21) Appl. No.: 15/569,652

(22) PCT Filed: May 11, 2016

(86) PCT No.: PCT/JP2016/064027
§ 371 (c)(1),
(2) Date: Oct. 26, 2017

(87) PCT Pub. No.: WO2016/181997
PCT Pub. Date: Nov. 17, 2016

(65) Prior Publication Data
US 2018/0355117 A1 Dec. 13, 2018

(30) Foreign Application Priority Data
May 11, 2015 (JP) ................................. 2015-096914

(51) Int. Cl.
| | | |
|---|---|---|
| *C01B 33/14* | (2006.01) | |
| *C08G 81/02* | (2006.01) | |
| *C01B 33/145* | (2006.01) | |
| *C08F 292/00* | (2006.01) | |
| *C09C 1/30* | (2006.01) | |

(52) U.S. Cl.
CPC .............. *C08G 81/02* (2013.01); *C01B 33/14* (2013.01); *C01B 33/145* (2013.01); *C08F 292/00* (2013.01); *C09C 1/3081* (2013.01)

(58) Field of Classification Search
None
See application file for complete search history.

(56) References Cited

U.S. PATENT DOCUMENTS

| | | | | | |
|---|---|---|---|---|---|
| 4,857,395 | A | * | 8/1989 | Benton ................. | C04B 41/009 428/306.6 |
| 6,303,229 | B2 | * | 10/2001 | Takahama ............ | C09D 183/02 427/387 |
| 6,579,929 | B1 | * | 6/2003 | Cole ....................... | A61K 8/25 524/492 |
| 2001/0018129 | A1 | * | 8/2001 | Shiota ............... | H01L 21/02126 428/447 |
| 2005/0233134 | A1 | * | 10/2005 | Kanai ...................... | C09D 5/18 428/328 |
| 2007/0167554 | A1 | * | 7/2007 | Ryang ...................... | B01J 21/08 524/492 |
| 2008/0069887 | A1 | * | 3/2008 | Baran .................... | B82Y 30/00 424/490 |
| 2008/0113162 | A1 | | 5/2008 | Barthel et al. | |
| 2008/0216709 | A1 | * | 9/2008 | Steingrover ........ | C01B 33/1415 106/287.11 |
| 2010/0006006 | A1 | * | 1/2010 | Bohlander ............ | C01B 33/325 106/287.13 |
| 2011/0039983 | A1 | * | 2/2011 | Kuehner ................ | B82Y 30/00 523/466 |
| 2011/0169200 | A1 | * | 7/2011 | Biglino ................... | C03B 19/12 264/621 |
| 2013/0287661 | A1 | * | 10/2013 | Begag .................. | B01J 20/3085 423/228 |
| 2013/0344338 | A1 | * | 12/2013 | Bekiarian .............. | B82Y 30/00 428/402 |

FOREIGN PATENT DOCUMENTS

| | | |
|---|---|---|
| JP | H10-059708 A | 3/1998 |
| JP | H10-081839 A | 3/1998 |
| JP | H10-176007 A | 6/1998 |
| JP | 2005-162533 A | 6/2005 |
| JP | 2005-170757 A | 6/2005 |
| JP | 2005-170758 A | 6/2005 |
| JP | 2006-321978 A | 11/2006 |
| JP | 2008-530255 A | 8/2008 |
| JP | 2010-503693 A | 2/2010 |
| WO | 2006/072407 A1 | 7/2006 |
| WO | 2008/033718 A1 | 3/2008 |

OTHER PUBLICATIONS

Gellermann et al. "Synthesis and Characterization of the Organic Surface Modifications of Monodisperse Colloidal Silica" Journal of Sol-Gel Science and Technology, 1997, 8, 173-176. (Year: 1997).*
Wu et al. "Surface Properties of submicrometer silica spheres modified with aminopropyltriethoxysilane and phenyltriethoxysilane" Journal of Colloid and Interface Science, 2006, 304, 119-124. (Year: 2006).*
Badley et al. "Surface Modification of Colloidal Silica" Langmuir, 1990, 6, 792-801. (Year: 1990).*
Jun. 7, 2016 International Search Report issued in Patent Application No. PCT/JP2016/064027.
Badley et al., "Surface Modification of Colloidal Silica", Langmuir, pp. 792-801, vol. 6, (1990).

* cited by examiner

*Primary Examiner* — Robert S Loewe
(74) *Attorney, Agent, or Firm* — Oliff PLC

(57) ABSTRACT

The aminosilane-modified colloidal silica dispersion contains colloidal silica particles having surfaces to which there are bound a first silyl group represented by the following formula (1): $R^1_a Si(OR^2)_{3-a} O-$ and a second silyl group represented by the following formula (2): $R^3_b Si(OR^4)_{3-b} O-$ and, as a dispersion medium, a mixed solvent formed of a polar solvent S1 having a dielectric constant at 20° C. of 15 or higher and lower than 60 and a non-polar solvent S2 having a dielectric constant at 20° C. of 1 or higher and lower than 15, at a mass ratio (S1/S2) of 0.3 to 6.

16 Claims, No Drawings

AMINOSILANE-MODIFIED COLLOIDAL SILICA DISPERSION AND METHOD OF MANUFACTURING SAME

TECHNICAL FIELD

The present invention relates to a surface-treated colloidal silica dispersion in which aminosilane-modified colloidal silica is dispersed in a dispersion medium; to a method for producing the dispersion; to a method for producing a surface-treated colloidal silica dispersion in which a functional group having a radical-generation site is introduced into silica particles; and to a method for producing a surface-treated colloidal silica dispersion in which silica particles are polymer-grafted.

BACKGROUND ART

Nano-composite materials containing nano particles in polymer have become of interest, and such material have actually been developed in the fields of optics and biology, environment and energy field, etc.

In one technique of forming such a composite, silica particles are surface-modified with an organic silicon compound having an amino group, and the silica particles are modified with a polymer through amidation, ureidation, ring-opening reaction of epoxide, etc. on the basis of such amino groups.

Conventionally, silica powder having a particle size of a few micrometers to a few hundred micrometers is generally used. However, such silica powder has low dispersibility, failing to attain uniform modification with an amino group. As a result, performance and transparency of the resultant composites are problematically poor.

One method for solving the above problem employs modification of nano-size colloidal silica particles with amino groups. In specific embodiments of the method, colloidal silica dispersed in water or a polar solvent is used.

As a method employing an aqueous dispersion of colloidal silica particles, there is disclosed a method including adding water-diluted aminopropyltrimethoxysilane to colloidal silica and maintaining the mixture at 65° C. for 3 hours (see Patent Document 1). Another disclosed method includes adding methanol-diluted 3-aminopropyltrimethoxysilane dropwise to colloidal silica and refluxing the mixture for 2 hours (see Patent Document 2). Still another disclosed method includes preparing an HCl-acidified aqueous solution of N-(β-aminoethyl)-γ-aminopropyltrimethoxysilane, adding an aqueous silica colloidal dispersion to the acidified solution, and maintaining the mixture at 75° C. for 30 minutes (see Patent Document 3).

In one mode of employing a colloidal silica dispersion in a polar organic solvent, 3-aminopropyltrimethoxysilane is added to a colloidal silica dispersion in an N,N-dimethylformamide dispersion, and the mixture is maintained at 100° C. for 24 hours under nitrogen (Non-Patent Document 1).

PRIOR ART DOCUMENTS

Patent Documents

Patent Document 1: Japanese Patent Application Laid-Open (kokai) No. 1998-059708
Patent Document 2: Japanese Patent Application Laid-Open (kokai) No. 2005-162533
Patent Document 3: Japanese Patent Application Laid-Open (kokai) No. 2006-321978

Non-Patent Documents

Non-Patent Document 1: Langmuir, 6, 792-801 (1990)

SUMMARY OF THE INVENTION

Problems to be Solved by the Invention

According to the methods disclosed in Patent Documents 1 and 2, the obtained aminosilane-modified colloidal silica is present as aqueous dispersion, whereas an organic compound having a functional group of interest or a polymer to be modified therewith can be dissolved only in organic solvent, which is problematic. In addition, when the method disclosed in Patent Document 1 is employed, a satisfactory dispersibility cannot be maintained, and certain turbidity is generated. Thus, difficulty is encountered in uniform modification with amino groups. When the method disclosed in Patent Document 3 is employed, used hydrochloric acid neutralizes amino groups, leading to difficulty in reaction between amino groups and an organic compound having a reactive functional group. In the method disclosed in Non-Patent Document 1, modification with amino groups can be completed while dispersibility is maintained. However, the reaction is limited to the case at a low silica concentration. Thus, the method is not industrially effective.

An object of the present invention is to provide an aminosilane-modified colloidal silica dispersion which maintains dispersibility during introduction of an amino group. Another object is to provide a method for producing the dispersion. Still another object is to provide a method for producing a surface-modified colloidal silica dispersion in which a functional group having a radical-generation site is introduced into silica particles. Yet another object is to provide a method for producing a surface-modified colloidal silica dispersion in which silica particles are polymer-grafted.

Means for Solving the Problems

The present inventors have conducted extensive studies in order to attain the aforementioned objects, and have found that, through adding an organic silicon compound having an amino group to a colloidal silica dispersion in a solvent mixture of a polar solvent and a non-polar solvent and subjecting the resultant mixture to thermal treatment, a favorably dispersed aminosilane-modified colloidal silica dispersion can be formed at high concentration without forming any aggregate. Accordingly, the present invention provides the following.

In a first aspect of the present invention, there is provided an aminosilane-modified colloidal silica dispersion comprising:

colloidal silica particles having surfaces to which there are bound a first silyl group represented by the following formula (1):

$$R^1{}_a Si(OR^2)_{3-a} O— \qquad (1)$$

(wherein $R^1$ represents a C1 to C10 substituted or non-substituted alkyl group or a phenyl group; $R^2$ represents a C1 to C4 alkyl group or a C1 to C4 alkoxyalkyl group; a is 1 to 3; a plurality of $R^1$s may be identical to or different from one another; and a plurality of $OR^2$s may be identical to or different from one another) and a second silyl group represented by the following formula (2):

(wherein $R^3$ represents a C1 to C4 alkyl group, a phenyl group, or a C1 to C3 alkyl group which is substituted with one or more groups selected from an amino group, an aminoalkyl group, and an alkylamino group; at least one $R^3$ is a C1 to C3 alkyl group which is substituted with any of the groups selected from an amino group, an aminoalkyl group, and an alkylamino group; $R^4$ represents a C1 to C4 alkyl group; b is 1 to 2; a plurality of $R^3$s may be identical to or different from one another; and a plurality of $OR^4$s may be identical to or different from one another); and, as a dispersion medium, a mixed solvent formed of a polar solvent S1 having a dielectric constant at 20° C. of 15 or higher and lower than 60 and a non-polar solvent S2 having a dielectric constant at 20° C. of 1 or higher and lower than 15, at a mass ratio (S1/S2) of 0.3 to 6.

A second aspect of the present invention is directed to a specific embodiment of the aminosilane-modified colloidal silica dispersion of the first aspect, wherein the amount of the first silyl group is 0.05 to 5 mmol/g with respect to the mass of silica, and the amount of the second silyl group is 0.02 to 3 mmol/g with respect to the mass of silica.

A third aspect of the present invention is directed to a specific embodiment of the aminosilane-modified colloidal silica dispersion of the first or second aspect, wherein the first silyl group is at least one member selected from the group consisting of a methyldimethoxysilyl group, a methyldiethoxysilyl group, a dimethylmethoxysilyl group, a dimethylethoxysilyl group, a trimethylsilyl group, a phenyldimethoxysilyl group, a phenyldiethoxysilyl group, a phenylmethylmethoxysilyl group, a phenylmethylethoxysilyl group, a phenyldimethylsilyl group, a γ-methacryloxypropyldimethoxysilyl group, a γ-methacryloxypropyldiethoxysilyl group, a γ-methacryloxypropylmethylmethoxysilyl group, a γ-methacryloxypropylmethylethoxysilyl group, a γ-acryloxypropyldimethoxysilyl group, a hexyldimethoxysilyl group, a hexyldiethoxysilyl group, a hexylmethylmethoxysilyl group, a hexyldimethylsilyl group, a decyldimethoxysilyl group, a decyldiethoxysilyl group, a decylmethylmethoxysilyl group, a decylmethylethoxysilyl group, and a decyldimethylsilyl group.

A fourth aspect of the present invention is directed to a specific embodiment of the aminosilane-modified colloidal silica dispersion of any of the first to third aspects, wherein the second silyl group is at least one member selected from the group consisting of an N-(2-aminoethyl)-3-aminopropylmethyldimethoxysilyl group, an N-(2-aminoethyl)-3-aminopropyltrimethoxysilyl group, an N-(2-aminoethyl)-3-aminopropylmethyldiethoxysilyl group, an N-(2-aminoethyl)-3-aminopropyltriethoxysilyl group, a 3-aminopropyltrimethoxysilyl group, a 3-aminopropyltriethoxysilyl group, an N-methylaminopropyltrimethoxysilyl group, an N-methylaminopropyltriethoxysilyl group, an N,N-dimethyl-3-aminopropyltrimethoxysilyl group, an N-ethyl-3-aminopropyltrimethoxysilyl group, N,N-diethyl-3-aminopropyltrimethoxysilyl group, and an N-phenyl-3-aminopropyltrimethoxysilyl group.

In a fifth aspect of the present invention, there is provided a method for producing an aminosilane-modified colloidal silica dispersion, characterized in that the method comprises:

a step of preparing a primary dispersion of colloidal silica being dispersed in a primary solvent which is one of a polar solvent S1 having a dielectric constant at 20° C. of 15 or higher and lower than 60 or a non-polar solvent S2 having a dielectric constant at 20° C. of 1 or higher and lower than 15, wherein colloidal silica particles contained therein have surfaces to which is bound a first silyl group represented by the following formula (1):

(wherein $R^1$ represents a C1 to C10 substituted or non-substituted alkyl group or a phenyl group; $R^2$ represents a C1 to C4 alkyl group or a C1 to C4 alkoxyalkyl group; a is 1 to 3; a plurality of $R^1$s may be identical to or different from one another; and a plurality of $OR^2$s may be identical to or different from one another), and a step of adding, as an additional solvent, a counter solvent member different from the primary solvent which is one of the polar solvent S1 or the non-polar solvent S2 contained in the primary dispersion; and a subsequent step of adding an aminosilane compound represented by the following formula (3):

(wherein $R^3$ represents a C1 to C4 alkyl group, a phenyl group, or a C1 to C3 alkyl group which is substituted with one or more groups selected from an amino group, an aminoalkyl group, and an alkylamino group; at least one $R^3$ is a C1 to C3 alkyl group which is substituted with any of the groups selected from an amino group, an aminoalkyl group, and an alkylamino group; $R^4$ represents a C1 to C4 alkyl group; b is 1 to 2; a plurality of $R^3$s may be identical to or different from one another; and a plurality of $OR^4$s may be identical to or different from one another), to thereby form colloidal silica, wherein the silica particles have surfaces to which are bound the first silyl group and a second silyl group represented by the following formula (2):

(wherein $R^3$ represents a C1 to C4 alkyl group, a phenyl group, or a C1 to C3 alkyl group which is substituted with one or more groups selected from an amino group, an aminoalkyl group, and an alkylamino group; at least one $R^3$ is a C1 to C3 alkyl group which is substituted with any of the groups selected from an amino group, an aminoalkyl group, and an alkylamino group; $R^4$ represents a C1 to C4 alkyl group; b is 1 or 2; a plurality of $R^3$s may be identical to or different from one another; and a plurality of $OR^4$s may be identical to or different from one another).

A sixth aspect of the present invention is directed to a specific embodiment of the aminosilane-modified colloidal silica dispersion production method of the fifth aspect, which method includes the following steps (a), (b), and (c):

(a) adding a polar solvent S1 having a dielectric constant at 20° C. of 15 or higher and lower than 60 to a colloidal silica in which silica particles are dispersed in a non-polar solvent S2 having a dielectric constant at 20° C. of 1 or higher and lower than 15, and the silica particles have surfaces to which is bound a first silyl group represented by the following formula (1):

(wherein $R^1$ represents a C1 to C10 substituted or non-substituted alkyl group or a phenyl group; $R^2$ represents a C1 to C4 alkyl group or a C1 to C4 alkoxyalkyl group; a is 1 to 3; a plurality of $R^1$s may be identical to or different from one another; and a plurality of $OR^2$s may be identical to or different from one another), in an amount of 0.05 to 5 mmol/g with respect to the mass of silica, such that the mass ratio (S1/S2) is adjusted to 0.3 to 6; and subsequently, mixing the colloidal silica with an aminosilane compound represented by the following formula (3):

$$R^3{}_b Si(OR^4)_{4-b} \qquad (3)$$

(wherein $R^3$ represents a C1 to C4 alkyl group, a phenyl group, or a C1 to C3 alkyl group which is substituted with one or more groups selected from an amino group, an aminoalkyl group, and an alkylamino group; at least one $R^3$ is a C1 to C3 alkyl group which is substituted with any of the groups selected from an amino group, an aminoalkyl group, and an alkylamino group; $R^4$ represents a C1 to C4 alkyl group; b is 1 or 2; a plurality of $R^3$s may be identical to or different from one another; and a plurality of $OR^4$s may be identical to or different from one another), in an amount of 0.02 to 3.0 mmol/g with respect to the mass of silica;

(b) a step of adjusting the water content of the mixture to a mole ratio of 0.05 to 1.8 with respect to the aminosilane compound; and (c) a step of thermally treating the colloidal silica dispersion obtained in step (b) at 20 to 200° C.

A seventh aspect of the present invention is directed to a specific embodiment of the aminosilane-modified colloidal silica dispersion production method of the fifth aspect, which method includes the following steps (e), (f), and (g):

(e) adding a non-polar solvent S2 having a dielectric constant at 20° C. of 1 or higher and lower than 15 to a colloidal silica in which silica particles are dispersed in a polar solvent S1 having a dielectric constant at 20° C. of 15 or higher and lower than 60, and the silica particles have surfaces to which is bound a first silyl group represented by the following formula (1):

$$R^1{}_a Si(OR^2)_{3-a}O— \qquad (1)$$

(wherein $R^1$ represents a C1 to C10 substituted or non-substituted alkyl group or a phenyl group; $R^2$ represents a C1 to C4 alkyl group or a C1 to C4 alkoxyalkyl group; a is 1 to 3; a plurality of $R^1$s may be identical to or different from one another; and a plurality of $OR^2$s may be identical to or different from one another), in an amount of 0.05 to 5 mmol/g with respect to the mass of silica, such that the mass ratio (S1/S2) is adjusted to 1 to 6; and subsequently, mixing the colloidal silica with an aminosilane compound represented by the following formula (3):

$$R^3{}_b Si(OR^4)_{4-b} \qquad (3)$$

(wherein $R^3$ represents a C1 to C4 alkyl group, a phenyl group, or a C1 to C3 alkyl group which is substituted with one or more groups selected from an amino group, an aminoalkyl group, and an alkylamino group; at least one $R^3$ is a C1 to C3 alkyl group which is substituted with any of the groups selected from an amino group, an aminoalkyl group, and an alkylamino group; $R^4$ represents a C1 to C4 alkyl group; b is 1 or 2; a plurality of $R^3$s may be identical to or different from one another; and a plurality of $OR^4$s may be identical to or different from one another), in an amount of 0.02 to 3.0 mmol/g with respect to the mass of silica;

(f) step of adjusting the water content of the mixture to a mole ratio of 0.4 to 5 with respect to the aminosilane compound; and (g) a step of thermally treating the colloidal silica dispersion obtained in step (f) at 20 to 200° C.

In an eighth aspect of the present invention, there is provided a method for producing a surface-treated colloidal silica dispersion containing silica particles having surfaces to which a functional group having a radical-generation site has been introduced, characterized in that the method comprises: the steps of (a), (b), and (c) employed in the sixth aspect; and subsequently, the following step (d):

(d) a step of adding, to the aminosilane-modified colloidal silica dispersion obtained in step (c), a compound represented by the following formula (4):

$$X—Y \qquad (4)$$

(wherein X represents a halo-carbonyl group, a carboxyl group, an aldehyde group, an isocyanate group, a thioisocyanate group, or an active ester group including a succinimido group; and Y represents an acetophenone derivative, an acyl phosphine oxide derivative, a titanocene derivative, a triazine derivative, a bisimidazole derivative, an O-acyloxime derivative, a benzophenone derivative, a thioxanthene derivative, an α-diketone derivative, an anthraquinone derivative, an azo compound derivative, or a peroxide derivative) in an equivalent of 0.05 to 100 with respect to the amount by mole of the aminosilane compound employed in step (a); and heating the mixture at 20 to 200° C.

A ninth aspect of the present invention is directed to a specific embodiment of the method of the eighth aspect for producing a surface-treated colloidal silica dispersion containing silica particles having surfaces to which a functional group having a radical-generation site has been introduced, which method comprises, in step (d), adding at least one condensing agent selected from the group consisting of a triazine-type condensing agent, an imidazole-type condensing agent, a phosphonium salt-type condensing agent, a carbodiimide-type condensing agent, a uronium-type condensing agent, and a succinimide-type condensing agent to a compound represented by the following formula (4):

$$X—Y \qquad (4)$$

(wherein X represents a halo-carbonyl group, a carboxyl group, an aldehyde group, an isocyanate group, a thioisocyanate group, or an active ester group including a succinimido group; and Y represents an acetophenone derivative, an acyl phosphine oxide derivative, a titanocene derivative, a triazine derivative, a bisimidazole derivative, an O-acyloxime derivative, a benzophenone derivative, a thioxanthone derivative, an α-diketone derivative, an anthraquinone derivative, an azo compound derivative, or a peroxide derivative) in an equivalent of 0.01 to 100 with respect to the amount by mole of the compound (4).

The tenth aspect of the present invention is directed to a method for producing a surface-treated colloidal silica dispersion containing silica particles having surfaces to which a functional group having a radical-generation site has been introduced, characterized in that the method comprises: the steps of (e), (f), and (g) employed in the seventh aspect; and subsequently, the following step (h):

(h) adding, to the aminosilane-modified colloidal silica dispersion obtained in step (g), a compound represented by the following formula (4):

$$X—Y \qquad (4)$$

(wherein X represents a halo-carbonyl group, a carboxyl group, an aldehyde group, an isocyanate group, a thioisocyanate group, or an active ester group including a succinimido group; and Y represents an acetophenone derivative, an acyl phosphine oxide derivative, a titanocene derivative, a triazine derivative, a bisimidazole derivative, an O-acyloxime derivative, a benzophenone derivative, a thioxanthone derivative, an α-diketone derivative, an anthraquinone derivative, an azo compound derivative, or a peroxide derivative) in an equivalent of 0.05 to 100 with respect to the amount by mole of the aminosilane compound employed in step (e); and heating the mixture at 20 to 200° C.

In an eleventh aspect of the present invention, there is provided a method of the above tenth aspect for producing a surface-treated colloidal silica dispersion containing silica particles having surfaces to which a functional group having a radical-generation site has been introduced, characterized in that the method includes, in step (h), adding at least one condensing agent selected from the group consisting of a triazine-type condensing agent, an imidazole-type condensing agent, a phosphonium salt-type condensing agent, a carbodiimide-type condensing agent, a uronium-type condensing agent, and a succinimide-type condensing agent to a compound represented by the following formula (4):

$$X—Y \quad (4)$$

(wherein X represents a halo-carbonyl group, a carboxyl group, an aldehyde group, an isocyanate group, a thioisocyanate group, or an active ester group including a succinimido group; and Y represents an acetophenone derivative, an acyl phosphine oxide derivative, a titanocene derivative, a triazine derivative, a bisimidazole derivative, an O-acyloxime derivative, a benzophenone derivative, a thioxanthone derivative, an α-diketone derivative, an anthraquinone derivative, an azo compound derivative, or a peroxide derivative) in an equivalent of 0.01 to 100 with respect to the amount by mole of the compound (4).

In a twelfth aspect of the present invention, there is provided a method for producing a surface-treated colloidal silica dispersion containing silica particles having polymer-grafted surfaces, characterized in that the method comprises adding a polymerizable monomer to surface-treated colloidal silica dispersion containing silica particles having surfaces to which a functional group having a radical-generation site has been introduced and produced through a method as recited in any of the eighth to eleventh aspects, and performing radical polymerization via an activate energy ray or heat.

In a thirteenth aspect of the present invention, there is provided a method for producing a multi-branched-polymer-modified colloidal silica dispersion, characterized in that the method comprises subjecting an aminosilane-modified colloidal silica dispersion obtained in any of the fifth to seventh aspects to the treatments of the following steps (i) and (j) repeatedly 2 to 10 times:

(i) a step of adding an α,β-unsaturated carbonyl compound to the aminosilane-modified colloidal silica dispersion, and heating the mixture at 10 to 200° C.; and (j) a step of adding a diamine compound to the dispersion obtained in step (i), and heating the mixture at 10 to 200° C.

In a fourteenth aspect of the present invention, there is provided a method for producing an aminosilane-modified colloidal silica dispersion, the dispersion medium being only a polar solvent S1 having a dielectric constant at 20° C. of 15 or higher and lower than 60; characterized in that the method comprises subjecting an aminosilane-modified colloidal silica dispersion obtained in any of the fifth to seventh aspects to the treatments of the following step (k):

(k) a step of heating the mixture at 50 to 200° C. under a pressure of 10 to 760 Torr, while adding to the mixture a polar solvent S1 having a dielectric constant at 20° C. of 15 or higher and lower than 60, to thereby remove a non-polar solvent S2 having a dielectric constant at 20° C. of 1 or higher and lower than 15.

Effects of the Invention

The aminosilane-modified colloidal silica dispersion produced according to the present invention exhibits a favorable dispersions status in a mixed solvent of a polar solvent and a non-polar solvent.

Furthermore, through substitution of the polar solvent of the aminosilane-modified colloidal silica dispersion produced in the present invention with a non-polar solvent, there can be produced an aminosilane-modified colloidal silica dispersion having a favorable dispersion status employing a polar solvent as a sole dispersion medium.

Since the aminosilane-modified colloidal silica dispersion produced in the present invention is synthesized in the absence of acid, no salt is formed from the amino groups with acid groups. Thus, a variety of functional groups can be introduced into silica particles by use of an organic compound having a target functional group. By use of the thus-introduced functional groups, a polymer can be grafted to the surfaces of the silica particles, to thereby form a nano-composite. The aminosilane-modified colloidal silica dispersion of the present invention, containing nanoparticles, can provide a nano-composite material having high transparency.

Modes for Carrying Out the Invention

The silica particles contained in the aminosilane-modified colloidal silica dispersion of the present invention have surfaces to which hydrophobic groups are bound. The hydrophobic groups are a first silyl group represented by the following formula (1):

$$R^1{}_aSi(OR^2)_{3-a}O— \quad (1)$$

(wherein $R^1$ represents a C1 to C10 substituted or non-substituted alkyl group or a phenyl group; $R^2$ represents a C1 to C4 alkyl group or a C1 to C4 alkoxyalkyl group; a is 1 to 3; a plurality of $R^1$s may be identical to or different from one another; and a plurality of $OR^2$s may be identical to or different from one another), and a second silyl group represented by the following formula (2):

$$R^3{}_bSi(OR^4)_{3-b}O— \quad (2)$$

(wherein $R^3$ represents a C1 to C4 alkyl group, a phenyl group, or a C1 to C3 alkyl group which is substituted with one or more groups selected from an amino group, an aminoalkyl group, and an alkylamino group; at least one $R^3$ is a C1 to C3 alkyl group which is substituted with any of the groups selected from an amino group, an aminoalkyl group, and an alkylamino group; $R^4$ represents a C1 to C4 alkyl group; b is 1 or 2; a plurality of $R^3$s may be identical to or different from one another; and a plurality of $OR^4$s may be identical to or different from one another). The silica particles are dispersed in a mixed solvent of a specific polar solvent and a specific non-polar solvent.

The colloidal silica contained in the aminosilane-modified colloidal silica dispersion is a compound to which are bound the first silyl group represented by formula (1) and the second silyl group represented by formula (2). In the compound, the amount of the first silyl group is 0.05 to 5 mmol/g with respect to the mass of silica, and the amount of the second silyl group is 0.02 to 3 mmol/g with respect to the mass of silica.

The first silyl group is, for example, at least one member selected from the group consisting of a methyldimethoxysilyl group, a methyldiethoxysilyl group, a dimethylmethoxysilyl group, a dimethylethoxysilyl group, a trimethylsilyl group, a phenyldimethoxysilyl group, a phenyldiethoxysilyl group, a phenylmethylmethoxysilyl group, a phenylmethylethoxysilyl group, a phenyldimethylsilyl group, a γ-methacryloxypropyldimethoxysilyl group, a γ-methacryloxypropyldiethoxysilyl group, a γ-methacryloxypropylmethylmethoxysilyl group, a γ-methacryloxypropylmethylethoxysilyl group, a γ-acryloxypropyldimethoxysilyl group, a hexyldimethoxysilyl group, a hexyldiethoxysilyl group, a hexylmethylmethoxysilyl group, a hexyldimethylsilyl group, a decyldimethoxysilyl group, a decyldiethoxysilyl group, a decylmethylmethoxysilyl group, a decylmethylethoxysilyl group, and a decyldimethylsilyl group.

The second silyl group is, for example, at least one member selected from the group consisting of an N-(2-aminoethyl)-3-aminopropylmethyldimethoxysilyl group, an N-(2-aminoethyl)-3-aminopropyltrimethoxysilyl group, an N-(2-aminoethyl)-3-aminopropylmethyldiethoxysilyl group, an N-(2-aminoethyl)-3-aminopropyltriethoxysilyl group, a 3-aminopropyltrimethoxysilyl group, a 3-aminopropyltriethoxysilyl group, an N-methylaminopropyltrimethoxysilyl group, an N-methylaminopropyltriethoxysilyl group, an N,N-dimethyl-3-aminopropyltrimethoxysilyl group, an N-ethyl-3-aminopropyltrimethoxysilyl group, an N,N-diethyl-3-aminopropyltrimethoxysilyl group, and an N-phenyl-3-aminopropyltrimethoxysilyl group.

Meanwhile, the aminosilane-modified colloidal silica in powder form can be produced through a conventional production method. However, when such powder-form colloidal silica has amino groups, difficulty is encountered in forming a dispersion of the colloidal silica due to aggregation or the like in a dispersion solvent.

Also, conventional dispersions of hydrophobized colloidal silica employ a polar solvent or a non-polar solvent as a dispersion medium. When the colloidal silica in the dispersion state is modified with aminosilane, gelation or the like occurs. Thus, this technique is not potent to produce aminosilane-modified colloidal silica.

In contrast, the aminosilane-modified colloidal silica dispersion of the present invention is produced through modification of colloidal silica in dispersion state with aminosilane. The production is realized by use of a mixed solvent of a specific polar solvent and a specific non-polar solvent, as a dispersion medium.

The aminosilane-modified colloidal silica dispersion production method of the present invention can be attained through modifying colloidal silica in a dispersion state with aminosilane, by use of a mixed solvent of a specific polar solvent and a specific non-polar solvent, as a dispersion medium. Furthermore, after formation of the aminosilane-modified colloidal silica dispersion of the present invention, the polar solvent is added to the dispersion, and the non-polar solvent is removed, whereby an aminosilane-modified colloidal silica dispersion employs only a specific polar solvent as a dispersion medium.

In the aminosilane-modified colloidal silica dispersion of the present invention, the colloidal silica has a particle size D (nm) of 5 to 500 nm. The mean primary particle size is calculated by the equation: D=2720/A (wherein A represents a specific surface area (m²/g) as determined through the nitrogen adsorption method). An aminosilane-modified colloidal silica dispersion having such a primary particle size has never been reported and is a completely novel one. Notably, the aminosilane-modified colloidal silica dispersion of the present invention is substantially transparent.

No particular limitation is imposed on the silica concentration of the aminosilane-modified colloidal silica dispersion of the present invention. The silica concentration is preferably 8 mass % or higher, more preferably 30 mass % or higher. When the silica concentration is excessively high, stability of the dispersion may decrease. Thus, the silica concentration is preferably 50 mass % or lower, more preferably 40 mass % or lower.

The aminosilane-modified colloidal silica dispersion of the present invention employs a mixed solvent as a dispersion medium. The mixed solvent formed of a polar solvent S1 having a dielectric constant at 20° C. of 15 or higher and lower than 60 and a non-polar solvent S2 having a dielectric constant at 20° C. of 1 or higher and lower than 15, with the mass ratio (S1/S2) being 0.3 to 6.

Examples of the polar solvent S1 having a dielectric constant at 20° C. of 15 or higher and lower than 60 include methanol, ethanol, propanol, butanol, isopropanol, isobutyl alcohol, dimethyl sulfoxide, N,N-dimethylformamide, N,N-dimethylacetamide, and N-methylpyrrolidone. These solvents may be used singly or in combination of two or more species.

Examples of the non-polar solvent S2 having a dielectric constant at 20° C. of 1 or higher and lower than 15 include benzene, toluene, xylene, n-pentane, n-hexane, n-heptane, cyclohexanone, methyl isobutyl ketone, methyl ethyl ketone, ethyl acetate, butyl acetate, diethyl ether, and dibutyl ether. These solvents may be used singly or in combination of two or more species.

In the aminosilane-modified colloidal silica dispersion of the present invention, the colloidal silica is modified with an aminosilane compound. To the surfaces of the silica particles, aminosilyl groups are bound. The aminosilane compound used for modifying the colloidal silica is represented by the following formula (3):

$$R^3_b Si(OR^4)_{4-b} \quad (3)$$

(wherein $R^3$ represents a C1 to C4 alkyl group, a phenyl group, or a C1 to C3 alkyl group which is substituted with one or more groups selected from an amino group, an aminoalkyl group, and an alkylamino group; at least one $R^3$ is a C1 to C3 alkyl group which is substituted with any of the groups selected from an amino group, an aminoalkyl group, and an alkylamino group; $R^4$ represents a C1 to C4 alkyl group; b is 1 or 2; a plurality of $R^3$s may be identical to or different from one another; and a plurality of $OR^4$s may be identical to or different from one another).

Specific examples of the aminosilane compound include N-(2-aminoethyl)-3-aminopropylmethyldimethoxysilane, N-(2-aminoethyl)-3-aminopropyltrimethoxysilane, N-(2-aminoethyl)-3-aminopropylmethyldiethoxysilane, N-(2-aminoethyl)-3-aminopropyltriethoxysilane, 3-aminopropyltrimethoxysilane, 3-aminopropyltriethoxysilane, N-methylaminopropyltrimethoxysilane, N-methylaminopropyltriethoxysilane, N,N-dimethyl-3-aminopropyltrimethoxysilane, N-ethyl-3-aminopropyltrimethoxysilane, N,N-diethyl-3-aminopropyltrimethoxysilane, and N-phenyl-3-aminopropyltrimethoxysilane.

Alternatively, a partial condensation product of the aminosilane compound may also be used. Examples thereof include an amino-group-having polyorganoalkoxysilane compound such as "KBP-90" (product of Shin-Etsu Silicone Co., Ltd.)

The aminosilane-modified colloidal silica dispersion of the present invention has amino groups on the surfaces of the silica particles, and the amino groups react with an organic compound having a reactive functional group, whereby a variety of functional groups may be introduced. Also, graft polymerization can be carried out to form a polymer. From the above aspects, the aminosilane compound preferably has a primary or secondary amino group, more preferably a primary amino group. Specific examples include 3-aminopropyltrimethoxysilane, 3-aminopropyltriethoxysilane, N-(2-aminoethyl)-3-aminopropyltrimethoxysilane, N-(2-aminoethyl)-3-aminopropyltriethoxysilane, N-(2-aminoethyl)-3-aminopropylmethyldimethoxysilane, N-(2-aminoethyl)-3-aminopropylmethyldiethoxysilane, N-methyl-3-aminopropyltrimethoxysilane, N-ethyl-3-aminopropyltrimethoxysilane, and N-phenyl-3-aminopropyltrimethoxysilane.

The amount of the aminosilane compound for modifying colloidal silica is preferably 0.02 to 3.0 mmol/g with respect to the mass of silica.

The aminosilane-modified colloidal silica dispersion of the present invention preferably contains water at a mole ratio of 0.05 to 5 with respect to 1 mole of amino silyl groups which modify colloidal silica.

The aminosilane-modified colloidal silica dispersion production method of the present invention comprises:

a step of preparing a primary dispersion of colloidal silica being dispersed in a primary solvent which is one of a polar solvent S1 having a dielectric constant at 20° C. of 15 or higher and lower than 60 or a non-polar solvent S2 having a dielectric constant at 20° C. of 1 or higher and lower than 15, wherein colloidal silica particles contained therein have surfaces to which is bound a first silyl group represented by the following formula (1):

$$R^1{}_a Si(OR^2)_{3-a}O— \quad (1)$$

(wherein $R^1$ represents a C1 to C10 substituted or non-substituted alkyl group or a phenyl group; $R^2$ represents a C1 to C4 alkyl group or a C1 to C4 alkoxyalkyl group; a is 1 to 3; a plurality of $R^1$s may be identical to or different from one another; and a plurality of $OR^2$s may be identical to or different from one another), and a step of adding, as an additional solvent, a counter solvent member different from the primary solvent which is one of the polar solvent S1 or the non-polar solvent S2 contained in the primary dispersion;

a subsequent step of adding an aminosilane compound represented by the following formula (3):

$$R^3{}_b Si(OR^4)_{4-b} \quad (3)$$

(wherein $R^3$ represents a C1 to C4 alkyl group, a phenyl group, or a C1 to C3 alkyl group which is substituted with one or more groups selected from an amino group, an aminoalkyl group, and an alkylamino group; at least one $R^3$ is a C1 to C3 alkyl group which is substituted with any of the groups selected from an amino group, an aminoalkyl group, and an alkylamino group; $R^4$ represents a C1 to C4 alkyl group; b is 1 or 2; a plurality of $R^3$s may be identical to or different from one another; and a plurality of $OR^4$s may be identical to or different from one another), whereby colloidal silica is formed wherein the silica particles have surfaces to which are bound the first silyl group and a second silyl group represented by the following formula (2):

$$R^3{}_b Si(OR^4)_{3-b}O— \quad (2)$$

(wherein $R^3$ represents a C1 to C4 alkyl group, a phenyl group, or a C1 to C3 alkyl group which is substituted with one or more groups selected from an amino group, an aminoalkyl group, and an alkylamino group; at least one $R^3$ is a C1 to C3 alkyl group which is substituted with any of the groups selected from an amino group, an aminoalkyl group, and an alkylamino group; $R^4$ represents a C1 to C4 alkyl group; b is 1 or 2; a plurality of $R^3$s may be identical to or different from one another; and a plurality of $OR^4$s may be identical to or different from one another).

According to the production method of the present invention, when the dispersion medium is the polar solvent S1, the non-polar solvent S2 is added to the dispersion, whereas when the dispersion medium is the non-polar solvent S2, the polar solvent S1 is added to the dispersion. The thus-prepared mixed solvent is subjected to modification with aminosilane, to thereby yield an aminosilane-modified colloidal silica dispersion without occurrence of gelation or the like.

Also, in production method of the present invention, it is important to control the amount of water serving as a trace component. In order to binding the aminosilane compound to surfaces of colloidal silica particles so as to form an aminosilane-modified colloidal silica dispersion, the aminosilane compound is required to be hydrolyzed. For this purpose, a very small amount of water is required. Meanwhile, when a large amount of water is present, the present water serves as a polar solvent. In this case, the dispersion of the aminosilane-modified colloidal silica dispersion is impaired, whereby gelation or the like occurs.

Notably, no particular limitation is imposed on the step of forming a first silyl group-bound colloidal silica; i.e., a primary dispersion of a hydrophobized colloidal silica. Thus, a colloidal silica dispersion employing the same solvent may be hydrophobized through a known method. Alternatively, colloidal silica may be hydrophobized with a dispersion employing a different solvent, and the solvent is converted through solvent substitution or a similar technique, to thereby prepare a primary dispersion. If possible, a hydrophobized colloidal silica powder may be dispersed in a medium, to thereby yield a primary dispersion. Thus, again, no particular limitation is imposed on the above step.

An embodiment of the aminosilane-modified colloidal silica dispersion production method includes the following steps (a), (b), and (c).

In the step (a), a polar solvent S1 having a dielectric constant at 20° C. of 15 or higher and lower than 60 is added to a colloidal silica in which silica particles are dispersed in a non-polar solvent S2 having a dielectric constant at 20° C. of 1 or higher and lower than 15, such that the mass ratio (S1/S2) is adjusted to 0.3 to 6; and subsequently, the colloidal silica is mixed with an aminosilane compound represented by the following formula (3):

$$R^3{}_b Si(OR^4)_{4-b} \quad (3)$$

(wherein $R^3$ represents a C1 to C4 alkyl group, a phenyl group, or a C1 to C3 alkyl group which is substituted with one or more groups selected from an amino group, an aminoalkyl group, and an alkylamino group; at least one $R^3$ is a C1 to C3 alkyl group which is substituted with any of the groups selected from an amino group, an aminoalkyl group, and an alkylamino group; $R^4$ represents a C1 to C4 alkyl group; b is 1 or 2; a plurality of $R^3$s may be identical to or different from one another; and a plurality of $OR^4$s may be identical to or different from one another), in an amount of 0.02 to 3.0 mmol/g with respect to the mass of silica. Subsequently, in step (b), the water content of the mixture is adjusted to a mole ratio of 0.05 to 1.8 with respect to the aminosilane compound added in the aforementioned step (a). Then, in the step (c), the colloidal silica dispersion obtained in step (b) is thermally treated at 20 to 200° C.

In the step (a), the mass ratio (S1/S2) of the polar solvent S1 having a dielectric constant at 20° C. of 15 or higher and lower than 60 to the non-polar solvent S2 is preferably 0.3 to 6.

The amount of the aminosilane compound added in the step (b) is 0.02 to 3 mmol/g with respect to silica. When the amount is smaller than 0.02 mmol/g, the amino groups for surface modification are present in a small amount, to thereby impede formation of a nano-composite via introduction of a functional group or via graft polymerization. When the amount is in excess of 3.0 mmol/g, an unreacted aminosilane compound remains in a considerable amount, whereby the dispersion stability of the produced colloidal silica dispersion is impaired. Both cases are not preferred.

In the case where the water content controlled in the step (b) is a mole ratio lower than 0.05 with respect to 1 mol of the aminosilane compound added in step (a), hydrolysis of the aminosilane compound is impeded, which is not preferred. When the water content higher than 1.8 in mole ratio with respect to 1 mol of the aminosilane compound added in the step (a), thickening or gelation disadvantageously occurs in step (c).

The aminosilane compound employed in step (b) is represented by the following formula (3):

$$R^3{}_b Si(OR^4)_{4-b} \qquad (3)$$

(wherein $R^3$ represents a C1 to C4 alkyl group, a phenyl group, or a C1 to C3 alkyl group which is substituted with one or more groups selected from an amino group, an aminoalkyl group, and an alkylamino group; at least one $R^3$ is a C1 to C3 alkyl group which is substituted with any of the groups selected from an amino group, an aminoalkyl group, and an alkylamino group; $R^4$ represents a C1 to C4 alkyl group; b is 1 or 2; a plurality of $R^3$s may be identical to or different from one another; and a plurality of $OR^4$s may be identical to or different from one another).

Specific examples of the aminosilane compound include N-(2-aminoethyl)-3-aminopropylmethyldimethoxysilane, N-(2-aminoethyl)-3-aminopropyltrimethoxysilane, N-(2-aminoethyl)-3-aminopropylmethyldiethoxysilane, N-(2-aminoethyl)-3-aminopropyltriethoxysilane, 3-aminopropyltrimethoxysilane, 3-aminopropyltriethoxysilane, N-methylaminopropyltrimethoxysilane, N-methylaminopropyltriethoxysilane, N,N-dimethyl-3-aminopropyltrimethoxysilane, N-ethyl-3-aminopropyltrimethoxysilane, N,N-diethyl-3-aminopropyltrimethoxysilane, and N-phenyl-3-aminopropyltrimethoxysilane.

Alternatively, a partial condensation product of the aminosilane compound may also be used. Examples thereof include an amino-group-having polyorganoalkoxysilane compound such as "KBP-90" (product of Shin-Etsu Silicone Co., Ltd.).

The silica particles dispersed in the colloidal silica in non-polar solvent S2 having a dielectric constant at 20° C. of 1 or higher and lower than 15 have hydrophobized surfaces.

The surfaces of the silica particles may be hydrophobized through a known technique. Examples of the product obtained by the technique include n-heptane-dispersed colloidal silica and toluene-dispersed colloidal silica (disclosed in Japanese Patent Application Laid-Open (kokai) No. 1992-1086060); toluene-dispersed colloidal silica (disclosed in Japanese Patent Application Laid-Open (kokai) No. 2005-170758); and methyl ethyl ketone-dispersed colloidal silica and methyl isobutyl ketone-dispersed colloidal silica (disclosed in Japanese Patent Application Laid-Open (kokai) No. 1999-43319).

An example of preferred hydrophobizing agents is at least one member selected from the group consisting of methyl trimethoxysilane, methyltriethoxysilane, dimethyldimethoxysilane, dimethyldiethoxysilane, phenyltrimethoxysilane, phenyltriethoxysilane, phenylmethyldimethoxysilane, phenylmethyldiethoxysilane, phenyldimethylmethoxysilane, phenyldimethylethoxysilane, γ-methacryloxypropyltrimethoxysilane, γ-methacryloxypropyltriethoxysilane, γ-methacryloxypropylmethyldimethoxysilane, γ-methacryloxypropylmethyldiethoxysilane, γ-acryloxypropyltrimethoxysilane, hexyltrimethoxysilane, hexylmethyldimethoxysilane, hexylmethyldiethoxysilane, hexyldimethylmethoxysilane, hexyldimethylethoxysilane, decyltrimethoxysilane, decyltriethoxysilane, decylmethyldimethoxysilane, decylmethyldiethoxysilane, decyldimethylmethoxysilane, decyldimethylethoxysilane, hexamethyldisiloxane, and hexamethyldisilazane.

The aminosilane-modified colloidal silica dispersion of the present invention has amino groups on the surfaces of the silica particles, and the amino groups react with an organic compound having a reactive functional group (e.g., a glycidyl group or a carboxyl group), whereby a variety of functional groups may be introduced. By means of the thus-introduced functional groups, there can be formed a nano-composite of silica particles having surfaces on which a polymerizable organic compound (e.g., styrene or methacrylic acid) is bound via graft polymerization.

Such functional groups may be easily introduced into silica particles through, for example, the following procedure. To the aforementioned aminosilane-modified colloidal silica dispersion of the present invention, a compound represented by the following formula (4):

$$X-Y \qquad (4)$$

(wherein X represents a halo-carbonyl group, a carboxyl group, an aldehyde group, an isocyanate group, a thioisocyanate group, or an active ester group including a succinimido group; and Y represents an acetophenone derivative, an acyl phosphine oxide derivative, a titanocene derivative, a triazine derivative, a bisimidazole derivative, an O-acyloxime derivative, a benzophenone derivative, a thioxanthone derivative, an α-diketone derivative, an anthraquinone derivative, an azo compound derivative, or a peroxide derivative) in an equivalent of 0.05 to 100 with respect to the amount by mole of the aminosilane compound employed in introduction of a group such as an aminosilyl group; and heating the mixture at 20 to 200° C.

An example of the compound represented by formula (4) is an acetophenone derivative in which the functional group X is a halo-carbonyl group, a carboxyl group, an aldehyde group, an isocyanate group, a thioisocyanate group, or an active ester group including a succinimido group. Specific examples include a 1-hydroxycyclohexyl phenyl ketone derivative, a 2-hydroxy-2-methyl-1-phenylpropan-1-one derivative, a benzoin derivative, a benzoin methyl ether derivative, a benzoin ethyl ether derivative, a benzoin propyl ether derivative, an acetophenone derivative, a 2,2-dimethoxy-2-phenylacetophenone derivative, a 2,2-diethoxyacetophnenone derivative, a benzyldimethyl ketal derivative, a 2-hydroxy-2-methylpropiophenone derivative, a 4-isopropyl-2-hydroxy-2-methylpropiophenone derivative, a 2-methyl-1-(4-(methylthio)phenyl)-2-morpholino-1-propan-1-one derivative, a dimethylbenzyl ketal derivative, a methylbenzoyl formate derivative, or a 2-benzyl-2-dimethylamino-1-(4-morpholinophenyl)-butan-1-one derivative, all members having, as a functional group, a halo-carbonyl group, a carboxyl group, an aldehyde group, an isocyanate group, a thioisocyanate group, or an active ester group including a succinimido group.

An example of the compound represented by formula (4) is an acyl phosphine oxide derivative in which the functional group X is a halo-carbonyl group, a carboxyl group, an aldehyde group, an isocyanate group, a thioisocyanate group, or an active ester group including a succinimido group. Specific examples in include a trimethylbenzoyldiphenylphosphine oxide derivative and a bis(2,4,6-trimethylbenzoyl)-phenylphosphine oxide derivative, all members having, as a functional group, a halo-carbonyl group, a carboxyl group, an aldehyde group, an isocyanate group, a thioisocyanate group, or an active ester group including a succinimido group.

Another example of the compound represented by formula (4) is a titanocene derivative in which the functional group X is a halo-carbonyl group, a carboxyl group, an aldehyde group, an isocyanate group, a thioisocyanate group, or an active ester group including a succinimido group. Specific examples include a bis($\eta^5$-2,4-cyclopentadien-1-yl)-bis(2,6-difluoro-3-(1H-pyrol-1-yl)-phenyl) titanium derivative, having, as a functional group, a halo-carbonyl group, a carboxyl group, an aldehyde group, an isocyanate group, a thioisocyanate group, or an active ester group including a succinimido group.

Another example of the compound represented by formula (4) is a triazine derivative in which the functional group X is a halo-carbonyl group, a carboxyl group, an aldehyde group, an isocyanate group, a thioisocyanate group, or an active ester group including a succinimido group. Specific examples include a trichloromethyltriazine derivative and a benzyl-2,4,6-(trihalomethyl)triazine derivative, all members having, as a functional group, a halo-carbonyl group, a carboxyl group, an aldehyde group, an isocyanate group, a thioisocyanate group, or an active ester group including a succinimido group.

Another example of the compound represented by formula (4) is a bisimidazole derivative in which the functional group X is a halo-carbonyl group, a carboxyl group, an aldehyde group, an isocyanate group, a thioisocyanate group, or an active ester group including a succinimido group. Specific examples include a 2-(o-chlorophenyl)-4,5-diphenylimidazolyl dimer derivative, having, as a functional group, a halo-carbonyl group, a carboxyl group, an aldehyde group, an isocyanate group, a thioisocyanate group, or an active ester group including a succinimido group.

Another example of the compound represented by formula (4) is an O-acyloxime derivative in which the functional group X is a halo-carbonyl group, a carboxyl group, an aldehyde group, an isocyanate group, a thioisocyanate group, or an active ester group including a succinimido group. Specific examples include 1,2-octanedione, a 1-[4-(phenylthio)-, 2-(O-benzoyloxime)] derivative or ethanone, and a 1-[9-ethyl-6-(2-methylbenzoyl)-9H-carbazol-3-yl]-, 1-(O-acetyloxime) derivative, all members having, as a functional group, a halo-carbonyl group, a carboxyl group, an aldehyde group, an isocyanate group, a thioisocyanate group, or an active ester group including a succinimido group.

Another example of the compound represented by formula (4) is a benzophenone derivative in which the functional group X is a halo-carbonyl group, a carboxyl group, an aldehyde group, an isocyanate group, a thioisocyanate group, or an active ester group including a succinimido group. Specific examples include a benzophenone derivative, a 4,4-bis(dimethylamino)benzophenone derivative, a 3,3-dimethyl-4-methoxy-benzophenone derivative, and a Michler's ketone derivative, all members having, as a functional group, a halo-carbonyl group, a carboxyl group, an aldehyde group, an isocyanate group, a thioisocyanate group, or an active ester group including a succinimido group.

Another example of the compound represented by formula (4) is a thioxanthone derivative in which the functional group X is a halo-carbonyl group, a carboxyl group, an aldehyde group, an isocyanate group, a thioisocyanate group, or an active ester group including a succinimido group. Specific examples include an isopropylthioxanthone derivative, a 2-chlorothioxanthone derivative, a 2,4-diethylthioxanthone derivative, an isopropylthioxanthone derivative, and a diisopropylthioxanthone derivative, all members having, as a functional group, a halo-carbonyl group, a carboxyl group, an aldehyde group, an isocyanate group, a thioisocyanate group, or an active ester group including a succinimido group.

Another example of the compound represented by formula (4) is a α-diketone derivative in which the functional group X is a halo-carbonyl group, a carboxyl group, an aldehyde group, an isocyanate group, a thioisocyanate group, or an active ester group including a succinimido group. Specific examples include a camphorquinone derivative, having, as a functional group, a halo-carbonyl group, a carboxyl group, an aldehyde group, an isocyanate group, a thioisocyanate group, or an active ester group including a succinimido group.

Another example of the compound represented by formula (4) is an anthraquinone derivative in which the functional group X is a halo-carbonyl group, a carboxyl group, an aldehyde group, an isocyanate group, a thioisocyanate group, or an active ester group including a succinimido group. Specific examples include an anthraquinone derivative, a 2-methylanthraquinone derivative, a 2-ethylanthraquinone derivative, and a tert-butylanthraquinone derivative, all members having, as a functional group, a halo-carbonyl group, a carboxyl group, an aldehyde group, an isocyanate group, a thioisocyanate group, or an active ester group including a succinimido group.

Another example of the compound represented by formula (4) is an azo compound derivative in which the functional group X is a halo-carbonyl group, a carboxyl group, an aldehyde group, an isocyanate group, a thioisocyanate group, or an active ester group including a succinimido group. Specific examples include a 2,2'-azobis(4-methoxy-2,4-dimethylvaleronitrile) derivative, a 2,2'-azobis(2-amidinopropane) dihydrochloride derivative, a 2,2'-azobis(2,4-dimethylvaleronitrile) derivative, a 2,2'-azobis(isobutyronitrile) derivative, a 2,2'-azobis(2-methylbutyronitrile) derivative, a 1,1-azobis(1-cyclohexanecarbonitrile) derivative, a 2,2'-azobis(2-cyclopropylpropionitrile) derivative, and a 2,2'-azobis(methyl isobutylate) derivative, all members having, as a functional group, a halo-carbonyl group, a carboxyl group, an aldehyde group, an isocyanate group, a thioisocyanate group, or an active ester group including a succinimido group.

Another example of the compound represented by formula (4) is a peroxide derivative in which the functional group X is a halo-carbonyl group, a carboxyl group, an aldehyde group, an isocyanate group, a thioisocyanate group, or an active ester group including a succinimido group. Specific examples include a benzoyl peroxide derivative, an acetyl peroxide derivative, a lauroyl peroxide derivative, a decanoyl peroxide derivative, a dicetylperoxy dicarbonate derivative, a di(4-t-butylcyclohexyl)peroxy dicarbonate derivative, a di(2-ethylhexyl)peroxy dicarbonate derivative, a t-butylperoxy pyvalate derivative, a t-butylperoxy-2-ethylhexanoate derivative, and a dicumyl peroxide derivative, all members having, as a functional group, a halo-carbonyl group, a carboxyl group, an aldehyde group, an isocyanate group, a thioisocyanate group, or an active ester group including a succinimido group.

In the step of introducing such a functional group, a condensing agent may be added to the compound represented by formula (4) in an amount of 0.01 to 100 equivalents with respect to the amount by mole of the compound represented by formula (4). The condensing agent is at least one condensing agent selected from the group consisting of a triazine-type condensing agent, an imidazole-type condensing agent, a phosphonium salt-type condensing agent, a carbodiimide-type condensing agent, a uronium-type condensing agent, and a succinimide-type condensing agent.

Examples of the triazine-type condensing agent include (4,6-dimethoxy-1,3,5-triazin-2-yl)-(2-octoxy-2-oxoethyl) dimethylammonium trifluoromethanesulfonate) and 4-(4,6-dimethoxy-1,3,5-triazin-2-yl)4-methylmorpholinium chloride (DMT-MM).

Examples of the imidazole-type condensing agent include N,N'-carbonyldiimidazole (CDI).

Examples of the phosphonium salt-type condensing agent include 1H-benzotriuazol-1-yloxy(dimethylamino)phosphonium hexafluorophosphate and 1H-benzotriazol-1-yloxytripyrrolidinophosphonium hexafluorophosphate.

Examples of the carbodiimide-type condensing agent condensing agent include 1-ethyl-3-(3-dimethylaminopropyl)carbodiimide hydrochloride (WSC), N,N'-dicyclohexylcarbodiimide (DCC), and N,N'-diisopropylcarbodiimide (DIC).

Examples of the uronium-type condensing agent condensing agent include O-(benzotriazol-1-yl)-N,N,N',N'-tetramethyluronium hexafluorophosphate (HBTU), O-(6-chlorobenzotriazol-1-yl)-N,N,N',N'-tetramethyluronium hexafluorophosphate (HCTU), and (1-[bis-(dimethylamino) methyliumyl]-1H-1,2,3-triazole[4,5-b]pyridine-3-oxide hexafluorophosphate (HATU).

Examples of the succinimide-type condensing agent condensing agent include N,N'-disuccinimidyl carbonate (DSC) and N-hydroxysuccinimide (HOSu).

The polymer-grafted and surface-treated colloidal silica dispersion of the present invention exhibits enhanced affinity to organic solvent or resin, by virtue of the polymer grafted onto the surfaces of the silica particles. Thus, such a colloidal silica dispersion is advantageously used for enhancing dispersion stability and for forming a composite in which silica particles are dispersed to high degree. In addition, by virtue of the properties of the polymer grafted onto the surfaces of the silica particles, the silica particles can be given functions such as photosensitivity, antibacterial property, bio-repellency, and UV-absorbing property. By use of the above-formed composite, both the properties intrinsic to colloidal silica and those realized by the polymer can be attained. Thus, high-function or multi-function composites can be advantageously produced.

To the multi-branched-polymer-modified colloidal silica dispersion of the present invention, terminal amino groups can be introduced at high density via modification with a multi-branched polymer. As described above, the amino groups introduced at high density react with an organic compound having a reactive functional group such as a glycidyl group or a carboxyl group, whereby functional groups of interest can be introduced at high density. By means of the thus-introduced functional groups, a polymerizable organic compound such as styrene or methacrylic acid can be grafted at high density via polymerization onto the surfaces of the silica particles, to thereby form a nano-composite. By virtue of the properties of the polymer grafted at high density onto the surfaces of the silica particles, there can be highly expected to show functions such as photosensitivity, antibacterial property, bio-repellency, and UV-absorbing property. Also, by means of the amino group introduced at high density, the silica particles or silica sol can be used as a hardening agent for epoxy resin or the like. In this case, there can be produced a composite in which the aforementioned silica particles are highly dispersed in epoxy resin or the like.

Meanwhile, the aminosilane-modified colloidal silica dispersion of the present invention employs, as a dispersion medium, a mixed solvent of a specific polar solvent and a specific non-polar solvent. However, through gradually adding a specific polar solvent so as to remove the non-polar solvent (i.e., solvent substitution), there can be readily produced an aminosilane-modified colloidal silica dispersion which has a favorable dispersion state and which employs a dispersion medium formed only of a specific polar solvent.

In the solvent substitution step, the pressure of the system is preferably adjusted to 10 to 760 Torr, and the step is preferably performed under heating at 50 to 200° C.

In the case of the aminosilane-modified colloidal silica dispersion employing, as a dispersion medium, a mixed solvent of a specific polar solvent and a specific non-polar solvent, a non-polar solvent may serve as a poor solvent, to thereby cause to deposit or precipitate a corresponding polymer component, during formation of a composite by mixing with the polymer component which can be dissolved only in a specific polar solvent (e.g., polyamide resin, polyester resin, polyimide resin, polycarbonate resin, or vinyl chloride resin). In this case, difficulty may be encountered in producing a nano-composite with such a polymer. In contrast, the aminosilane-modified colloidal silica dispersion prepared through removing a non-polar solvent via solvent substitution employs solo polar solvent as a dispersion medium. In this case, the colloidal silica dispersion contains no non-polar solvent serving as a poor solvent. Thus, upon formation of a composite by mixing with the polymer component which can be dissolved only in a specific polar solvent, deposition or precipitation of the polymer component can be prevented, whereby a composite with the target polymer component can be readily produced.

EXAMPLES

The present invention will next be described in detail by way of the Examples and the Comparative Examples. However, the Examples should not be construed as limiting the invention thereto.

<Measurement of the Amount of Introduced Aminosilane>

The amount of aminosilane introduced into the aminosilane-modified colloidal silica dispersion was obtained by centrifuging the formed aminosilane-modified colloidal silica dispersion at 5,000 rpm for 30 minutes, to thereby remove aminosilane remaining in the dispersion; drying the precipitates at 60° C. for 4 hours under reduced pressure; and measuring the nitrogen concentration by means of an element analyzer (PE2400 Series II CHNS/O Analyzer, product of Perkin Elmer).

Example 1

To a 300-mL eggplant-shaped flask, a colloidal silica dispersion (in toluene) (particle size: 12 nm, silica concentration: 40 mass %, water content: 0.027 mass %, product of Nissan Chemical Industries, Ltd.) (100 g) was added, and then methanol (30 mass % with respect to non-polar solvent, product of Kanto Kagaku) (18 g) and 3-aminopropyltrimethoxysilane (KBM-903, product of Shin-Etsu Chemical Co., Ltd., 0.28 mmol/g with respect to silica) (2 g) were added. Pure water (0.17 g) was added to the above mixture so that the water content was adjusted to a mole ratio of 1.0 mole with respect to aminosilane. The resultant mixture was maintained at 65° C. for 3 hours under stirring, to thereby yield 120.17 g of an aminosilane-modified colloidal silica dispersion. The thus-obtained aminosilane-modified colloidal silica dispersion was found to have a silica concentration of 33.3 mass %, a toluene concentration of 50.0 mass %, a methanol concentration of 14.9 mass %, and a water content of 0.14 mass %, and was in a favorable dispersion state. The amount of aminosilane introduced into silica was 0.21 mmol/g as obtained through element analysis.

Example 2

The procedure of Example 1 was repeated, except that methanol (100 mass % with respect to non-polar solvent) (60 g) was added as a polar solvent, to thereby yield 162.17 g of an aminosilane-modified colloidal silica dispersion. The thus-obtained aminosilane-modified colloidal silica dispersion was found to have a silica concentration of 24.7 mass %, a toluene concentration of 37.0 mass %, a methanol concentration of 37.0 mass %, and a water content of 0.12 mass %, and was in a favorable dispersion state. The amount of aminosilane introduced into silica was 0.19 mmol/g.

Example 3

The procedure of Example 1 was repeated, except that methanol (300 mass % with respect to non-polar solvent) (180 g) was added as a polar solvent, to thereby yield 282.17 g of an aminosilane-modified colloidal silica dispersion. The thus-obtained aminosilane-modified colloidal silica dispersion was found to have a silica concentration of 14.2 mass %, a toluene concentration of 21.3 mass %, a methanol concentration of 63.8 mass %, and a water content of 0.07 mass %, and was in a favorable dispersion state. The amount of aminosilane introduced into silica was 0.16 mmol/g.

Example 4

The procedure of Example 1 was repeated, except that methanol (500 mass % with respect to non-polar solvent) (300 g) was added as a polar solvent, to thereby yield 402.17 g of an aminosilane-modified colloidal silica dispersion. The thus-obtained aminosilane-modified colloidal silica dispersion was found to have a silica concentration of 9.9 mass %, a toluene concentration of 14.9 mass %, a methanol concentration of 74.6 mass %, and a water content of 0.05 mass %, and was in a favorable dispersion state. The amount of aminosilane introduced into silica was 0.20 mmol/g.

Example 5

The procedure of Example 1 was repeated, except that methanol. (166.7 mass % with respect to non-polar solvent (180 g) was added as a polar solvent, and heating was performed at 50° C. for about 15 hours, to thereby yield 202.17 g of an aminosilane-modified colloidal silica dispersion. The thus-obtained aminosilane-modified colloidal silica dispersion was found to have a silica concentration of 19.8 mass %, a toluene concentration of 29.7 mass %, a methanol concentration of 49.5 mass %, and a water content of 0.10 mass %, and was in a favorable dispersion state. The amount of aminosilane introduced into silica was 0.19 mmol/g.

Example 6

The procedure of Example 1 was repeated, except that isobutyl alcohol (166.7 mass % with respect to non-polar solvent) (100 g) was added as a polar solvent, and heating was performed at 50° C. for about 15 hours, to thereby yield 202.17 g of an aminosilane-modified colloidal silica dispersion. The thus-obtained aminosilane-modified colloidal silica dispersion was found to have a silica concentration of 19.8 mass %, a toluene concentration of 29.7 mass %, an isobutyl alcohol concentration of 49.5 mass %, and a water content of 0.10 mass %, and was in a favorable dispersion state. The amount of aminosilane introduced into silica was 0.25 mmol/g.

Example 7

The procedure of Example 1 was repeated, except that dimethyl sulfoxide (166.7 mass % with respect to non-polar solvent) (100 g) was added as a polar solvent, and heating was performed at 50° C. for about 15 hours, to thereby yield 202.17 g of an aminosilane-modified colloidal silica dispersion. The thus-obtained aminosilane-modified colloidal silica dispersion was found to have a silica concentration of 19.8 mass %, a toluene concentration of 29.7 mass %, a dimethyl sulfoxide concentration of 49.5 mass %, and a water content of 0.10 mass %, and was in a favorable dispersion state. The amount of aminosilane introduced into silica was 0.24 mmol/g.

Example 8

The procedure of Example 1 was repeated, except that N-methylpyrrolidone (100 mass % with respect to non-polar solvent) (60 g) was added as a polar solvent, to thereby yield 162.17 g of an aminosilane-modified colloidal silica dispersion. The thus-obtained aminosilane-modified colloidal silica dispersion was found to have a silica concentration of 24.7 mass %, a toluene concentration of 37.0 mass %, an N-methylpyrrolidone concentration of 37.0 mass %, and a water content of 0.12 mass %, and was in a favorable dispersion state. The amount of aminosilane introduced into silica was 0.24 mmol/g.

Comparative Example 1

The procedure of Example 1 was repeated, except that methanol serving as a polar solvent was not added, but 3-aminopropyltrimethoxysilane (2 g) was added. As a result, the mixture was gelled immediately after the addition, failing to form an aminosilane-modified colloidal silica dispersion.

Comparative Example 2

The procedure of Example 1 was repeated, except that tetrahydrofuran was used instead of methanol. The amount of tetrahydrofuran was adjusted to 100 g (i.e., 166.7 mass % with respect to non-polar solvent), and 3-aminopropyltrimethoxysilane (2 g) was added. As a result, the mixture was gelled immediately after the addition, failing to form an aminosilane-modified colloidal silica dispersion.

Example 9

To a 300-mL eggplant-shaped flask, a colloidal silica dispersion (in methyl isobutyl ketone) (particle size: 12 nm, silica concentration: 30 mass % and water content: 0.070 mass %, product of Nissan Chemical Industries, Ltd.) (100 g) was added, and then methanol (product of Kanto Kagaku) (21 g) and 3-aminopropyltrimethoxysilane (KBM-903, product of Shin-Etsu Chemical Co., Ltd., 0.28 mmol/g with respect to silica) (1.5 g) were added. Pure water (0.08 g) was added to the above mixture so that the water content was adjusted to a mole ratio of 1.0 mole with respect to aminosilane. The resultant mixture was maintained at 65° C. for 3 hours under stirring, to thereby yield 122.58 g of an aminosilane-modified colloidal silica dispersion. The thus-obtained aminosilane-modified colloidal silica dispersion was found to have a silica concentration of 24.5 mass %, a methyl isobutyl ketone concentration of 49.0 mass %, a methanol concentration of 17.0 mass %, and a water content of 0.12 mass % was in a favorable dispersion state. The amount of aminosilane introduced into silica was 0.20 mmol/g.

Comparative Example 3

To a 300-mL eggplant-shaped flask, a colloidal silica dispersion (in methanol) (particle size: 12 nm, silica concentration: 30.5 mass %, water content: 0.20 mass %, product of Nissan Chemical Industries, Ltd.) (100 g) was added, and then 3-aminopropyltrimethoxysilane (KBM-903, product of Shin-Etsu Chemical Co., Ltd., 0.28 mmol/g with respect to silica) (1.5 g) was added. As a result, the mixture was gelled immediately after the addition, failing to form an aminosilane-modified colloidal silica dispersion.

Example 10

The procedure of Example 1 was repeated, except that no pure water was added, to thereby yield 120 g of an aminosilane-modified colloidal silica dispersion. The thus-obtained aminosilane-modified colloidal silica dispersion was found to have a silica concentration of 33.3 mass %, a toluene concentration of 50.0 mass %, a methanol concentration of 14.9 mass %, and a water content of 0.022 mass %, and was in a favorable dispersion state. The amount of aminosilane introduced into silica was 0.23 mmol/g.

Example 11

The procedure of Example 1 was repeated, except that pure water (0.27 g) was added so as to adjust the water content (by mole ratio) with respect to aminosilane to 1.5, to thereby yield 120.27 g of an aminosilane-modified colloidal silica dispersion. The thus-obtained aminosilane-modified colloidal silica dispersion was found to have a silica concentration of 33.3 mass %, a toluene concentration of 49.9 mass %, a methanol concentration of 14.9 mass %, and a water content of 0.25 mass %, and was in a favorable dispersion state. The amount of aminosilane introduced into silica was 0.23 mmol/g.

Comparative Example 4

The procedure of Example 1 was repeated, except that pure water (0.37 g) was added, so as to adjust the mole ratio thereof to 2.0, with respect to aminosilane. As a result, the mixture was gelled during the heating treatment, failing to form an aminosilane-modified colloidal silica dispersion.

Example 12

The procedure of Example 1 was repeated, except that heating was performed at 23° C. for 5 days, to thereby yield 120.17 g of an aminosilane-modified colloidal silica dispersion. The thus-obtained aminosilane-modified colloidal silica dispersion was found to have a silica concentration of 33.3 mass %, a toluene concentration of 50.0 mass %, a methanol concentration of 14.9 mass %, and a water content of 0.14 mass %, and was in a favorable dispersion state. The amount of aminosilane introduced into silica was 0.21 mmol/g.

Example 13

The procedure of Example 1 was repeated, except that heating was performed at 40° C. for 6 hours, to thereby yield 120.17 g of an aminosilane-modified colloidal silica dispersion. The thus-obtained aminosilane-modified colloidal silica dispersion was found to have a silica concentration of 33.3 mass %, a toluene concentration of 50.0 mass %, a methanol concentration of 14.9 mass %, and a water content of 0.14 mass %, and was in a favorable dispersion state. The amount of aminosilane introduced into silica was 0.23 mmol/g.

Example 14

The procedure of Example 1 was repeated, except that heating was performed at 65° C. for 30 minutes, to thereby yield 120.17 g of an aminosilane-modified colloidal silica dispersion. The thus-obtained aminosilane-modified colloidal silica dispersion was found to have a silica concentration of 33.3 mass %, a toluene concentration of 50.0 mass %, a methanol concentration of 14.9 mass %, and a water content of 0.14 mass %, and was in a favorable dispersion state. The amount of aminosilane introduced into silica was 0.23 mmol/g.

Example 15

The procedure of Example 1 was repeated, except that dimethyl sulfoxide (166.7 mass % with respect to non-polar solvent) (100 g) was added as a polar solvent, and heating was performed at 120° C. for 3 hours, to thereby yield 202.17 g of an aminosilane-modified colloidal silica dispersion. The thus-obtained aminosilane-modified colloidal silica dispersion was found to have a silica concentration of 19.8 mass %, a toluene concentration of 29.7 mass %, a dimethyl sulfoxide concentration of 49.5 mass %, and a water content of 0.10 mass %, and was in a favorable dispersion state. The amount of aminosilane introduced into silica was 0.24 mmol/g.

Example 16

The procedure of Example 1 was repeated, except that 3-aminopropyltrimethoxysilane was added in an amount of 4 g (0.56 mmol/g with respect to silica), and no pure water was added, to thereby yield 122 g of an aminosilane-modified colloidal silica dispersion. The thus-obtained aminosilane-modified colloidal silica dispersion was found to have a silica concentration of 32.8 mass %, a toluene concentration of 49.2 mass %, a methanol concentration of 14.8 mass %, and a water content of 0.022 mass %, and was in a favorable dispersion state. The amount of aminosilane introduced into silica was 0.21 mmol/g.

Example 17

The procedure of Example 1 was repeated, except that 3-aminopropyltrimethoxysilane was added in an amount of 20 g (2.8 mmol/g with respect to silica), and no pure water was added, to thereby yield 138 g of an aminosilane-modified colloidal silica dispersion. The thus-obtained aminosilane modified colloidal silica dispersion was found to have a silica concentration of 29.0 mass %, a toluene concentration of 43.5 mass %, a methanol concentration of 13.0 mass %, and a water content of 0.019 mass %, and was in a favorable dispersion state. The amount of aminosilane introduced into silica was 0.41 mmol/g.

Example 18

To a 300-mL, eggplant-shaped flask, a surface-treated colloidal silica dispersion (in methanol) (particle size: 12 nm, silica concentration: 30 mass %, water content: 0.60 mass %, product of Nissan Chemical Industries, Ltd.) (100 g). Subsequently, toluene (166.7 mass % (polar solvent non-polar solvent), product of Kanto Kagaku) (42 g) as a non-polar solvent and 3-aminopropyltrimethoxysilane (KBM-903, product of Shin-Etsu Chemical Co., Ltd., 0.28 mmol/g with respect to silica) (1.51 g) were added, and the mixture was agitated. The water content was 3.91 by mole ratio, with respect to aminosilane. Subsequently, the resultant mixture was heated at about 50° C. for about 15 hours, to thereby yield 143.51 g of an aminosilane-modified colloidal silica dispersion. The thus-obtained aminosilane-modified colloidal silica dispersion was found to have a silica concentration of 20.9 mass %, a methanol concentration of 48.8 mass %, a toluene concentration of 48.8 mass %, and a water content of 0.41 mass %, and was in a favorable dispersion state. The amount of aminosilane introduced into silica was 0.20 mmol/g.

Example 19

The procedure of Example 18 was repeated, except that the amount of toluene was changed to 70.1 g (100 mass % (polar solvent/non-polar solvent)), to thereby yield 171.61 g of an aminosilane-modified colloidal silica dispersion. The water content was 3.98 by mole ratio, with respect to aminosilane. The thus-obtained aminosilane-modified colloidal silica dispersion was found to have a silica concentration of 17.5 mass %, a methanol concentration of 40.8 mass %, a toluene concentration of 40.8 mass %, and a water content of 0.35 mass %, and was in a favorable dispersion state. The amount of aminosilane introduced into silica was 0.19 mmol/g.

Comparative Example 5

The procedure of Example 18 was repeated, except that a surface-treated colloidal silica (dispersed in methanol, water content: 1.24 mass %, particle size: 12 nm, silica concentration: 30 mass %, product of Nissan Chemical Industries, Ltd.) was used. As a result, the mixture was gelled immediately after addition of 3-aminopropyltrimethoxysilane, failing to form an aminosilane-modified colloidal silica dispersion. Notably, water content was 8.18 by mole ratio, with respect to aminosilane.

Comparative Example 6

The procedure of Example 18 was repeated, except that surface-non-treated colloidal silica (dispersed in methanol, particle size: 12 nm, silica concentration: 30 mass %, water content: 0.60 mass %, product of Nissan Chemical Industries, Ltd.) (50 g) was used, and the amount of toluene was changed to 116.7 g (30 mass % (polar solvent/non-polar solvent)). When 3-aminopropyltrimethoxysilane (0.75 g, 0.28 mmol/g with respect to silica) was added to the mixture, the mixture was gelled immediately after addition, failing to form an aminosilane-modified colloidal silica dispersion. Notably, the water content was 3.98 by mole ratio, with respect to aminosilane.

Synthesis Example 1

To a 100-mL round-bottom flask, 4,4'-azobis(4-cyanovaleric acid) (hereinafter abbreviated as ACVA) (5 g (0.0178 mol)), N,N-dimethyl-4-aminopyridine (hereinafter abbreviated as DMAP) (0.128 g), tetrahydrofuran (hereinafter abbreviated as THF) (50 mL), and n-propanol (1.07 g (0.0178 mol, equivalent to ACVA)) were added, and the mixture was stirred at 0° C. N,N'-Dicyclohexylcarbodiimide (hereinafter abbreviated as DCC) (3.67 g (0.0178 mol)) serving as a condensing agent and dissolved in dichloromethane (20 mL) was gradually added to the stirred mixture by means of a burette, and then, the mixture was allowed to stand at 0° C. for 12 hours. Subsequently, by-products were removed through filtration under reduced pressure, and the filtrate was concentrated under reduced pressure by means of an evaporator, to thereby remove THF. Dichloromethane (50 mL) was added to the concentrated product, and the mixture was transferred to a separatory funnel. The mixture was thrice subjected to liquid separation by use of saturated brine, to thereby remove unreacted ACVA. The thus-recovered organic layer was transferred to a beaker, and an appropriate amount of magnesium sulfate was added thereto for dehydration. Magnesium sulfate was removed through filtration under reduced pressure, and the filtrate was concentrated again by means of an evaporator, to thereby synthesize ACVA-MP in which one end carboxyl group of ACVA was protected with n-propanol.

Synthesis Example 2

The procedure of Synthesis example 1 was repeated, except that ACVA (3 g (0.011 mol), DMAP (0.077 g), benzyl alcohol (1.13 g (0.0105 mol)) (instead of n-propanol (1.07 g)), and DCC (2.27 g (0.011 mol)) were employed, to thereby synthesize ACVA-Bz in which one end carboxyl group of ACVA was protected with benzyl alcohol.

Synthesis Example 3

To a 100-mL round-bottom flask, ACVA (1 g (0.00357 mol)), N-hydroxysuccinimide (hereinafter abbreviated as NHS) (0.41 g (0.00357 mol)), THF (50 mL), and acetonitrile (25 mL) were added, and the mixture was stirred at 0° C. Water-soluble carbodiimide (hereinafter abbreviated as WSC) (0.68 g (0.00357 mol) serving as a condensing agent was added to the stirred mixture, and the resultant mixture was stirred at 25° C. for 24 hours in the dark. Subsequently, the solvent was removed through concentration under reduced pressure by means of an evaporator. Ion-exchange water was added to the concentrated product under stirring, to thereby form white precipitates. The white precipitates were separated, to thereby synthesize ACVA-NHS in which one end carboxyl group of ACVA was activated with NHS.

Example X1

The procedure of Example 1 was repeated, except that the amount of colloidal silica (dispersed in toluene) was changed to 5 g, and the reaction scale (including the reactor) was reduced, to thereby form an aminosilane-modified colloidal silica dispersion. To the dispersion, added were a solution containing ACVA-MP synthesized in Synthesis example 1 (0.17 g (0.95 mole equivalents with respect to the used aminosilane compound)) and 4-(4,6-dimethoxy-1,3,5-triazin-2-yl)-4-methylmorpholinium chloride (hereinafter abbreviated as DMT-MM) (0.15 g (1 mole equivalent with respect to ACVA-MP)) serving as a condensing agent which were dissolved in a mixed solvent of toluene (6.6 mL) and methanol (2 mL), and the resultant mixture was allowed to react at 35° C. for 6 hours under stirring, to thereby yield a surface-treated colloidal silica dispersion in which ACVA-MP was bound to surface amino groups of colloidal silica particles via amido bonds, and azo groups were introduced as radical-generation sites. The thus-obtained dispersion underwent no gelation and maintained high dispersibility.

Example X2

The procedure of Example X1 was repeated, except that ACVA-Bz synthesized in Synthesis example 2 was used instead of ACVA-MP, and ACVA-Bz (1.0 g (4.84 mole equivalents with respect to the used aminosilane compound)) and DMT-MM (0.75 g (1 mole equivalent with respect to ACVA-Bz)) were dissolved in a mixed solvent of toluene (16.6 mL) and methanol (5 mL), to thereby yield a surface-treated colloidal silica dispersion in which ACVA-Bz was bound to surface amino groups of colloidal silica particles via amido bonds, and azo groups were introduced as radical-generation sites. The thus-obtained dispersion underwent no gelation and maintained high dispersibility.

Comparative Example X1

The procedure of Example X1 was repeated, except that ACVA was used instead of ACVA-MP, in an amount of 0.15 g (0.96 mole equivalents with respect to the used aminosilane compound). In this case, the dispersion was gelled before addition of ACVA and heating, thereby failing to produce a surface-treated colloidal silica dispersion in which azo groups were introduced as radical-generation sites.

Example X3

The procedure of Example 7 was repeated, except that the reaction scale (including the reactor) was reduced; the amount of colloidal silica (dispersed in toluene) was changed to 3 g; the amount of toluene was changed to 3 mL; the amount of dimethyl sulfoxide was changed to 5 mL; and heating was performed at 65° C. for 3 hours, to thereby form an aminosilane-modified colloidal silica dispersion. To the dispersion, added were a solution containing ACVA-MP synthesized in Synthesis example 1 (0.16 g (1.44 mole equivalents with respect to the used aminosilane compound)) and DMT-MM (0.13 g (1 mole equivalent to ACVA-MP)) serving as a condensing agent which were dissolved in a mixed solvent of toluene (3 mL) and dimethyl sulfoxide (3 mL), and the resultant mixture was allowed to react at 35° C. for 6 hours under stirring, to thereby yield a surface-treated colloidal silica dispersion in which ACVA-MP was bound to surface amino groups of colloidal silica particles via amido bonds, and azo groups were introduced as radical-generation sites. The thus-obtained dispersion underwent no gelation and maintained high dispersibility.

In Example X3, the surface-treated colloidal silica dispersion in which azo groups were introduced as radical-generation sites was subjected to thermogravimetric analysis. As a result, the azo group introduction amount was determined to 0.11 mmol/g with respect to silica.

Example X4

The procedure of Example X3 was repeated, except that ACVA-Bz was used instead of ACVA-MP, in an amount of 0.18 g (1.43 mole equivalents with respect to the used aminosilane compound), to thereby yield a surface-treated colloidal silica dispersion in which ACVA-Bz was bound to surface amino groups of colloidal silica particles via amido bonds, and azo groups were introduced as radical-generation sites. The thus-obtained dispersion underwent no gelation and maintained high dispersibility.

In Example X4, the surface-treated colloidal silica dispersion in which azo groups were introduced as radical-generation sites was subjected to thermogravimetric analysis. As a result, the azo group introduction amount was determined to 0.10 mmol/g with respect to silica.

Example XX1

The procedure of Example X3 was repeated, except that N-methylpyrrolidone was used instead of dimethyl sulfoxide, and ACVA-Bz was used instead of ACVA-MP, in an amount of 0.18 g (1.43 mole equivalents with respect to the used aminosilane compound), to thereby yield a surface-treated colloidal silica dispersion in which ACVA-Bz was bound to surface amino groups of colloidal silica particles via amido bonds, and azo groups were introduced as radical-generation sites. The thus-obtained dispersion underwent no gelation and maintained high dispersibility. Notably, the surface-treated colloidal silica dispersion in which azo groups were introduced as radical-generation sites was subjected to thermogravimetric analysis. As a result, the azo group introduction amount was determined to 0.15 mmol/g with respect to silica. Thus, the azo group introduction amount was found to be enhanced by using N-methylpyrrolidone instead of dimethyl sulfoxide as a reaction solvent.

Example X5

The procedure of Example X3 was repeated, except that ACVA-NHS synthesized in Synthesis example 3 was added instead of ACVA-MP, in an amount of 0.18 g (1.43 mole equivalents with respect to the used aminosilane compound), and no condensing agent was used. In this case, NHS groups were eliminated. As a result, there was obtained a surface-treated colloidal silica dispersion in which ACVA was bound to surface amino groups of colloidal silica particles via amido bonds, and azo groups were introduced as radical-generation sites. The thus-obtained dispersion underwent no gelation and maintained high dispersibility.

In Example X5, the surface-treated colloidal silica dispersion in which azo groups were introduced as radical-generation sites was subjected to thermogravimetric analysis. As a result, the azo group introduction amount was determined to 0.17 mmol/g with respect to silica. Also, in preparation of the surface-treated colloidal silica dispersion having azo groups introduced as radical-generation sites by means of amino groups on the surface of the colloidal silica particles, the azo group introduction amount was found to be increased through activating terminal carboxylic groups to be reacted with amino groups by use of NHS without using a condensing agent.

Example XX2

The procedure of Example X3 was repeated, except that N-methylpyrrolidone was used instead of dimethyl sulfoxide, and ACVA-NHS was used instead of ACVA-MP; that ACVA-NHS in an amount of 0.18 g (1.43 mole equivalents with respect to the used aminosilane compound) was used; and no condensing agent was used. As a result, NHS groups were eliminated, and ACVA formed amido bonds with surface amino groups of the colloidal silica, to thereby yield a surface-treated colloidal silica dispersion in which azo groups were introduced as radical-generation sites. The thus-obtained dispersion underwent no gelation and maintained high dispersibility. Through thermogravimetric analysis, the azo group introduction amount was determined to 0.20 mmol/g with respect to silica. Thus, the azo group introduction amount was found to be enhanced by using N-methylpyrrolidone instead of dimethyl sulfoxide as a reaction solvent.

Example X6

The surface-treated colloidal silica dispersion in produced in Example X3 in which azo groups were introduced as radical-generation sites was subjected to centrifugation at 20,000 rpm for 6 hours, whereby the solvent was removed from the solid content. Unreacted products were also removed along with the solvent. Subsequently, toluene (15 mL) and dimethyl sulfoxide (4.5 mL) were added to the solid content, and the mixture was ultrasonicated, so as to re-disperse the solid content, to thereby prepare a surface-treated colloidal silica dispersion in which azo groups were introduced as radical-generation sites. To the thus-prepared dispersion, methyl methacrylate (hereinafter abbreviated as MMA) (5 mL) was added, and the mixture was heated at 70° C. for 24 hours under stirring for polymerization. MMA was polymerized by the mediation of the radicals generated from the introduced azo groups, to thereby form a PMMA-grafted surface-treated colloidal silica dispersion. The thus-obtained dispersion was not gelled, assumed yellow, and maintained high dispersibility. Separately, the solid content was centrifuged with a solvent at 20,000 rpm for 12 hours, and the separated solid was washed, to thereby recover a new solid. The solid was dried and subjected to thermogravimetric analysis (TGA), to thereby calculate a PMMA grafting ratio (percent). As a result, the percent PMMA grafting ratio was 26% based on the weight of silica.

Example X7

The procedure of Example X6 was repeated, except that the surface-treated colloidal silica dispersion obtained in Example X4 in which dispersion azo groups were introduced as radical-generation sites was used. In this case, MMA was polymerized by the mediation of the radicals generated from the introduced azo groups, to thereby form a PMMA-grafted surface-treated colloidal silica dispersion. The thus-obtained dispersion was not gelled, assumed yellow, and maintained high dispersibility. Notably, the percent PMMA grafting ratio was 14% based on the weight of silica.

Example XX3

The procedure of Example X6 was repeated, except that the surface-treated colloidal silica dispersion obtained in Example XX1 in which dispersion azo groups were introduced as radical-generation sites was used, and that N-methylpyrrolidone was used instead of dimethyl sulfoxide. In this case, MMA was polymerized by the mediation of the radicals generated from the introduced azo groups, to thereby form a PMMA-grafted surface-treated colloidal silica dispersion. The thus-obtained dispersion was not gelled, and maintained high dispersibility. Notably, the percent PMMA grafting ratio was 52% based on the weight of silica. Thus, the percent PMMA grafting ratio was found to be enhanced by use of N-methylpyrrolidone as a solvent for PMMA grafting, instead of dimethyl sulfoxide.

Example XX4

The procedure of Example X6 was repeated, except that the surface-treated colloidal silica dispersion obtained in Example XX2 in which dispersion azo groups were introduced as radical-generation sites was used, and that N-methylpyrrolidone was used instead of dimethyl sulfoxide. In this case, MMA was polymerized by the mediation of the radicals generated from the introduced azo groups, to thereby form a PMMA-grafted surface-treated colloidal silica dispersion. The thus-obtained dispersion was not gelled, and maintained high dispersibility. Notably, the percent PMMA grafting ratio was 67% based on the weight of silica. In preparation of the surface-treated colloidal silica dispersion having azo groups introduced as radical-generation sites, the azo group introduction amount was found to be increased through activating terminal carboxylic groups to be reacted with amino groups by use of NHS without using a condensing agent. In addition, the final percent PMMA grafting ratio was found to be enhanced.

Example XX5

Poly(methyl methacrylate) powder (av. mol. weight (Mw) of 15,000, product of Wako Pure Chemical Industries, Ltd.) (0.5 g) was dissolved in a mixed solvent of N-methylpyrrolidone (6.0 mL) and ethylene glycol monobutyl ether (0.6 mL). Separately, the PMMA-grafted surface-treated colloidal silica dispersion obtained in Example XX4 was subjected to centrifugation at 20,000 rpm for 12 hours, and the solid was separated and washed, to thereby form PMMA-grafted surface-treated colloidal silica particles (0.5 g (as silica), 0.84 g as PMMA-grafted silica particles). The silica particles were added to the above mixture, to thereby prepare a coating solution. The coating solution was added dropwise to a glass substrate, and the applied coating solution was spread by means of a spin coater at 1,000 rpm for 30 seconds. The coating solution was dried, to thereby form a composite thin film formed of a PMMA-grafted surface-treated colloidal silica and PMMA. The thus-obtained composite thin film was smooth and transparent. Also, the thin film was uniformed, such that no aggregates having dimensions of some tens of micrometers were identified through observation under a digital microscope (×500).

Comparative Example XX1

The procedure of Example XX5 was repeated, except that the colloidal silica dispersion (in toluene) (particle size: 12 nm, product of Nissan Chemical Industries, Ltd.) was used instead of the PMMA-grafted surface-treated colloidal silica dispersion, to thereby prepare a composite thin film of colloidal silica and PMMA. The thus-obtained composite thin film was smooth and transparent. However, some aggregates having such dimensions of 10 to 20 µm were detected through observation under a digital microscope (×500). Thus, microscopic uniformity was poor.

Example X8

The procedure of Example 7 was repeated, except that the reaction scale (including the reactor) was reduced; the amount of colloidal silica (dispersed in toluene) was changed to 5 g; the amount of toluene was changed to 1.6 mL; the amount of dimethyl sulfoxide was changed to 5 mL; and heating was performed at 65° C. for 3 hours, to thereby form an aminosilane-modified colloidal silica dispersion. To the colloidal silica dispersion, added were 2-benzoylbenzoic acid (hereinafter abbreviated as BBA) (1.18 g (1.43 mole equivalents with respect to the used aminosilane compound) and DMT-MM (0.22 g (1 mole equivalent with respect to BBA)) serving as a condensing agent which were dissolved in a mixed solvent of toluene (3 mL) and dimethyl sulfoxide (3 mL). The resultant mixture was allowed to react at 60° C. for 6 hours under stirring, to thereby yield a surface-treated colloidal silica dispersion in which BBA was bound to surface amino groups of colloidal silica particles via amido bonds, and BBA groups were introduced as radical-generation sites. The thus-obtained dispersion underwent no gelation and maintained high dispersibility.

Example X9

The surface-treated colloidal silica dispersion in produced in Example X8 in which BBA was introduced as a radical-generation site was subjected to centrifugation at 20,000 rpm for 6 hours, whereby the solvent was removed from the solid content. Unreacted products were also removed along with the solvent. Subsequently, toluene (15 mL) and dimethyl sulfoxide (4.5 mL) were added to the solid content, and the mixture was ultrasonicated, so as to re-disperse the solid content, to thereby prepare a surface-treated colloidal silica dispersion in which BBA was introduced as a radical-generation site. To the thus-prepared dispersion, methyl methacrylate (hereinafter abbreviated as MMA) (5 mL) was added, and the mixture was stirred with a stirrer for 24 hours under irradiation with UV for polymerization. MMA was photo-polymerized by the mediation of the radicals generated from introduced BBA, to thereby form a PMMA-grafted surface-treated colloidal silica dispersion. The thus-obtained dispersion was not gelled, assumed yellow, and maintained high dispersibility. Separately, the solid content was centrifuged with a solvent at 20,000 rpm for 12 hours, and the separated solid was washed, to thereby recover a new solid. The solid was dried and subjected to thermogravimetric analysis (TGA), to thereby calculate a percent PMMA grafting ratio. As a result, the percent PMMA grafting patio was 6.9% based on the weight of silica.

Example XX6

The surface-treated colloidal silica dispersion in produced in Example X8 in which BBA was introduced as a radical-generation site was subjected to centrifugation at 20,000 rpm for 6 hours, whereby the solvent was removed from the solid content. Unreacted products were also removed along with the solvent. Subsequently, the thus-recovered solid content (1.2 g as silica) and polyethylene glycol diacrylate having a molecular weight (Mn) of 700 (1.0 g) were added to N-methylpyrrolidone (1.0 mL) with mixing, to thereby prepare a varnish of a surface-treated colloidal silica dispersion in which BBA was introduced. The varnish was poured into a mold (20 mm×30 mm×1 made of Teflon plates and irradiated with UV (intensity: 100 W, wavelength: 312 to 577 nm) for 30 minutes, for bulk curing. As a result, BBA introduced to the colloidal silica worked as a photo-radical polymerization initiator, and a transparent bulk cure product was yielded.

Comparative Example XX2

The procedure of Example XX6 was repeated, except that a colloidal silica (dispersed in toluene, particle size: 12 nm, product of Nissan Chemical industries, Ltd.) (3 g) was used instead of the surface-treated colloidal silica dispersion in which BBA was introduced as a radical-generation site. The varnish was tried to be bulk-cured, but no bulk cure product was yielded.

Example X10

The procedure of Example 1 was repeated, except that the amount of the colloidal silica dispersion in toluene was changed to 5 g, and the reaction scale (including the reactor) was reduced, to thereby form an aminosilane-modified colloidal silica dispersion. To the dispersion, methyl acrylate (hereinafter abbreviated as MA) (5 mL) was added, and the mixture was heated at 50° C. for 24 hours under stirring by means of a stirrer, to thereby cause Michel reaction between MA and amino groups on the surfaces of colloidal silica particles. Thereafter, the reaction product was centrifuged at 20,000 rpm for 6 hours, whereby the solvent was removed from solid content. Unreacted MA was also removed along with the solvent. Subsequently, methanol (hereinafter abbreviated as MeOH) (10 mL) was added to the solid content, and the mixture was ultrasonicated, to thereby re-disperse the solid content. To the dispersion, ethylenediamine (hereinafter abbreviated as EDA) (5 mL) was added, and the mixture was heated at 50° C. for 24 hours under stirring by means of a stirrer, to thereby introduce amino groups to the terminals again. Thereafter, the reaction product was centrifuged at 20,000 rpm for 6 hours, whereby the solvent was removed from the solid content. Unreacted EDA was also removed along with the solvent. Again, MeOH (10 mL) was added to the solid content, and the mixture was ultrasonicated, to thereby re-disperse the solid content. Thus, a colloidal silica dispersion in which amidoamine (hereinafter abbreviated as AMAM) was introduced to the surfaces of colloidal silica particles (1st-generation) was formed. The sequential procedure including addition of MA, centrifugation, re-dispersion, addition of EDA, centrifugation, and re-dispersion was repeated five times, whereby colloidal silica dispersions in which polyamidoamine (hereinafter abbreviated as PAMAM)-grafted dendrimers were introduced to the surfaces of colloidal silica particles (2- to 5-generation) were formed. The percent grafting ratio of the 5-generation PAMAM dendrimer-grafted colloidal silica dispersion was calculated through thermogravimetric analysis (TGA). As a result, the percent grafting ratio was 45% based on the weight of silica. The thus-obtained dispersions in which 1- to 5-generation PAMAM dendrimer-grafted colloidal silica dispersion were not gelled in each step, and maintained high dispersibility. Also, such high re-dispersibility may be maintained even after removal of the solvent through centrifugation.

Example XX7

In Example X10, the colloidal silica dispersion to which 5-generation PAMAM dendrimer was grafted to the surfaces of colloidal silica particles was subjected to a sequential procedure including addition of MA, centrifugation, re-dispersion, addition of EDA, centrifugation, and re-dispersion was repeated five times, whereby colloidal silica dispersions in which polyamidoamine (hereinafter abbreviated as PAMAM) dendrimers were grafted to the surfaces of colloidal silica particles (6- to 10-generation) were formed. The percent grafting ratio of the 10-generation PAMAM dendrimer-grafted colloidal silica dispersion was calculated through thermogravimetric analysis (TGA). As a result, the percent grafting ratio was 422% based on the weight of silica, and the amino group content was 23.8 mmol/g based on the weight of silica. The thus-obtained dispersions in which 6- to 10-generation PAMAM dendrimer-grafted colloidal silica dispersion were not gelled in each step, and maintained high dispersibility. Also, such high re-dispersibility may be maintained even after removal of the solvent through centrifugation.

Example XX8

The colloidal silica dispersion produced in Example X10 to which 5-generation PAMAM dendrimer was grafted to the surfaces of colloidal silica particles was subjected to centrifugation at 20,000 rpm for 6 hours, whereby the solvent was removed from the solid content. The thus-recovered solid content (1.0 g as silica) was mixed with a bisphenol A epoxy resin (Epichlon 850-S product of DIC) (0.5 g), to thereby prepare an epoxy resin-based varnish of a 5-generation PAMAM dendrimer-grafted colloidal silica. The varnish was poured into a mold (20 mm×30 mm×1 mm) made of Teflon plates and heated at 120° C. for 3 hours, for bulk curing. As a result, terminal amino groups of the PAMAM dendrimer grafted to colloidal silica particles worked as an epoxy curing agent, to thereby yield a yellow, transparent bulk cure product. The pensile hardness, as measured in accordance with JIS K5600 1-4 (the scratch method), was 2H.

Comparative Example XX3

The procedure of Example XX8 was repeated, except that the 5-generation PAMAM dendrimer-grafted colloidal silica dispersion was not used, and hexamethylenediamine (0.1 g) was used as a curing agent so as to perform bulk curing. As a result, a transparent bulk cure product was obtained. However, the pensile hardness of the product was F, which was lower than that of a similar cured product obtained from the 5-generation PAMAM dendrimer-grafted colloidal silica.

Comparative Example XX4

The procedure of Example XX8 was repeated, except that the colloidal silica dispersion (in toluene) (particle size: 12 nm, product of Nissan Chemical Industries, Ltd.) (1.2 g (0.5 g as silica) was used instead of the 5-generation PAMAM dendrimer-grafted colloidal silica dispersion, and that hexamethylenediamine (0.1 g) was used as a curing agent so as to perform bulk curing. As a result, a transparent bulk cure product was obtained. However, the pensile hardness of the product was H, which was lower than that of a similar cured product obtained from the 5-generation PAMAM dendrimer-grafted colloidal silica.

Example X11

The aminosilane-modified colloidal silica dispersion obtained in Example 7 (100 g) was placed into a 300-mL eggplant-shaped flask. While N-methylpyrrolidone was added to the flask under a reduced pressure of 150 to 120 Torr by means of a rotary evaporator, the mixture was heated at 115 to 125° C. on an oil bath so as to remove toluene via distillation, to thereby yield 100 g of an aminosilane-modified colloidal silica dispersion having a dispersion medium formed only of N-methylpyrrolidone as a polar solvent. The thus-obtained aminosilane-modified colloidal silica dispersion was in a favorable dispersion state, with a silica concentration of 24.7 mass %.

The invention claimed is:

1. An aminosilane-modified colloidal silica dispersion comprising:
    colloidal silica particles having surfaces to which there are bound a first silyl group represented by the following formula (1):

$$R^1_a Si(OR^2)_{3-a}O—\qquad(1)$$

wherein $R^1$ represents a C1 to C10 substituted or non-substituted alkyl group or a phenyl group; $R^2$ represents a C1 to C4 alkyl group or a C1 to C4 alkoxyalkyl group; a is 1 to 3; a plurality of $R^1$s may be identical to or different from one another; and a plurality of $OR^2$s may be identical to or different from one another, and a second silyl group represented by the following formula (2):

$$R^3_b Si(OR^4)_{3-b}O—\qquad(2)$$

wherein $R^3$ represents a C1 to C4 alkyl group, a phenyl group, or a C1 to C3 alkyl group which is substituted with one or more groups selected from an amino group, an aminoalkyl group, and an alkylamino group; at least one $R^3$ is a C1 to C3 alkyl group which is substituted with any of the groups selected from an amino group, an aminoalkyl group, and an alkylamino group; $R^4$ represents a C1 to C4 alkyl group; b is 1 or 2; a plurality of $R^3$s may be identical to or different from one another; a plurality of $OR^4$s may be identical to or different from one another; and no salt is formed from the amino group, the aminoalkyl group, and the alkylamino group with acid groups; and, as a dispersion medium,
    a mixed solvent formed of a polar solvent S1 having a dielectric constant at 20° C. of 15 or higher and lower than 60 and a non-polar solvent S2 having a dielectric constant at 20° C. of 1 or higher and lower than 15, at a mass ratio (S1/S2) of 0.3 to 6,
       wherein a silica concentration in the aminosilane-modified colloidal silica dispersion is in a range of 8 mass % to 50 mass %.
2. An aminosilane-modified colloidal silica dispersion according to claim 1, wherein the amount of the first silyl group is 0.05 to 5 mmol/g with respect to the mass of silica, and the amount of the second silyl group is 0.02 to 3 mmol/g with respect to the mass of silica.

3. An aminosilane-modified colloidal silica dispersion according to claim 1, wherein the first silyl group is at least one member selected from the group consisting of a methyldimethoxysilyl group, a methyldiethoxysilyl group, a dimethylmethoxysilyl group, a dimethylethoxysilyl group, a trimethylsilyl group, a phenyldimethoxysilyl group, a phenyldiethoxysilyl group, a phenylmethylmethoxysilyl group, a phenylmethylethoxysilyl group, a phenyldimethylsilyl group, a γ-methacryloxypropyldimethoxysilyl group, a γ-methacryloxypropyldiethoxysilyl group, a γ-methacryloxypropylmethylmethoxysilyl group, a γ-methacryloxypropylmethylethoxysilyl group, a γ-acryloxypropyldimethoxysilyl group, a hexyldimethoxysilyl group, a hexyldiethoxysilyl group, a hexylmethylmethoxysilyl group, a hexyldimethylsilyl group, a decyldimethoxysilyl group, a decyldiethoxysilyl group, a decylmethylmethoxysilyl group, a decylmethylethoxysilyl group, and a decyldimethylsilyl group.

4. An aminosilane-modified colloidal silica dispersion according to claim 1, wherein the second silyl group is at least one member selected from the group consisting of an N-(2-aminoethyl)-3-aminopropylmethylmethoxysilyl group, an N-(2-aminoethyl)-3-aminopropyldimethoxysilyl group, an N-(2-aminoethyl)-3-aminopropylmethylethoxysilyl group, an N-(2-aminoethyl)-3-aminopropyldiethoxysilyl group, a 3-aminopropyldimethoxysilyl group, a 3-aminopropyldiethoxysilyl group, an N-methylaminopropyltdimethoxysilyl group, an N-methylaminopropyldiethoxysilyl group, an N,N-dimethyl-3-aminopropyldimethoxysilyl group, an N-ethyl-3-aminopropyldimethoxysilyl group, an N,N-diethyl-3-aminopropyldimethoxysilyl group, and an N-phenyl-3-aminopropyldimethoxysilyl group.

5. An aminosilane-modified colloidal silica dispersion according to claim 1, wherein the colloidal silica particles have a mean primary particle size D in a range of from 5 to 500 nm.

6. An aminosilane-modified colloidal silica dispersion according to claim 1, wherein an amount of water content in the aminosilane-modified colloidal silica dispersion is in a range of from 0.17 mol to 1.5 mol with respect to 1 mol of the second silyl groups.

7. A method for producing an aminosilane-modified colloidal silica dispersion, wherein the method comprises:
preparing a primary dispersion of colloidal silica being dispersed in a primary solvent which is one of a polar solvent S1 having a dielectric constant at 20° C. of 15 or higher and lower than 60 or a non-polar solvent S2 having a dielectric constant at 20° C. of 1 or higher and lower than 15, wherein colloidal silica particles contained therein having surfaces to which is bound a first silyl group represented by the following formula (1):

$R^1{}_a Si(OR^2)_{3-a}O-$ (1)

wherein $R^1$ represents a C1 to C10 substituted or non-substituted alkyl group or a phenyl group; $R^2$ represents a C1 to C4 alkyl group or a C1 to C4 alkoxyalkyl group; a is 1 to 3; a plurality of $R^1$s may be identical to or different from one another; and a plurality of $OR^2$s may be identical to or different from one another, and
adding, as an additional solvent, a counter solvent member different from the primary solvent which is one of the polar solvent S1 or the non-polar solvent S2 contained in the primary dispersion; and
a subsequent addition of an aminosilane compound represented by the following formula (3):

$R^3{}_b Si(OR^4)_{4-b}O-$ (3)

wherein $R^3$ represents a C1 to C4 alkyl group, a phenyl group, or a C1 to C3 alkyl group which is substituted with one or more groups selected from an amino group, an aminoalkyl group, and an alkylamino group; at least one $R^3$ is a C1 to C3 alkyl group which is substituted with any of the groups selected from an amino group, an aminoalkyl group, and an alkylamino group; $R^4$ represents a C1 to C4 alkyl group; b is 1 or 2; a plurality of $R^3$s may be identical to or different from one another; and a plurality of $OR^4$s may be identical to or different from one another, to thereby form colloidal silica, wherein the silica particles have surfaces to which are bound the first silyl group and a second silyl group represented by the following formula (2):

$R^3{}_b Si(OR^4)_{3-b}O-$ (2)

wherein $R^3$ represents a C1 to C4 alkyl group, a phenyl group, or a C1 to C3 alkyl group which is substituted with one or more groups selected from an amino group, an aminoalkyl group, and an alkylamino group; at least one $R^3$ is a C1 to C3 alkyl group which is substituted with any of the groups selected from an amino group, an aminoalkyl group, and an alkylamino group; $R^4$ represents a C1 to C4 alkyl group; b is 1 or 2; a plurality of $R^3$s may be identical to or different from one another; and a plurality of $OR^4$s may be identical to or different from one another.

8. An aminosilane-modified colloidal silica dispersion production method according to claim 7, which comprises:
(a) adding a polar solvent S1 having a dielectric constant at 20° C. of 15 or higher and lower than 60 to a colloidal silica in which silica particles are dispersed in a non-polar solvent S2 having a dielectric constant at 20° C. of 1 or higher and lower than 15, and the silica particles have surfaces to which is bound a first silyl group represented by the following formula (1):

$R^1{}_a Si(OR^2)_{3-a}O-$ (1)

wherein $R^1$ represents a C1 to C10 substituted or non-substituted alkyl group or a phenyl group; $R^2$ represents a C1 to C4 alkyl group or a C1 to C4 alkoxyalkyl group; a is 1 to 3; a plurality of $R^1$s may be identical to or different from one another; and a plurality of $OR^2$s may be identical to or different from one another, in an amount of 0.05 to 5 mmol/g with respect to the mass of silica, such that the mass ratio (S1/S2) is adjusted to 0.3 to 6; and subsequently, mixing the colloidal silica with an aminosilane compound represented by the following formula (3):

$R^3{}_b Si(OR^4)_{4-b}O-$ (3)

wherein $R^3$ represents a C1 to C4 alkyl group, a phenyl group, or a C1 to C3 alkyl group which is substituted with one or more groups selected from an amino group, an aminoalkyl group, and an alkylamino group; at least one $R^3$ is a C1 to C3 alkyl group which is substituted with any of the groups selected from an amino group, an aminoalkyl group, and an alkylamino group; $R^4$ represents a C1 to C4 alkyl group; b is 1 or 2; a plurality of $R^3$s may be identical to or different from one another; and a plurality of $OR^4$s may be identical to or different from one another, in an amount of 0.02 to 3.0 mmol/g with respect to the mass of silica;
(b) adjusting the water content of the mixture to a mole ratio of 0.05 to 1.8 with respect to the aminosilane compound; and (c) thermally treating the colloidal silica dispersion obtained in (b) at 20 to 200° C.

9. A method for producing a surface-treated colloidal silica dispersion containing silica particles having surfaces to which a functional group having a radical-generation site has been introduced, wherein the method comprises: (a), (b), and (c) employed in claim 8; and subsequently:
(d) adding, to the aminosilane-modified colloidal silica dispersion obtained in (c), a compound represented by the following formula (4):

wherein X represents a halo-carbonyl group, a carboxyl group, an aldehyde group, an isocyanate group, a thioisocyanate group, or an active ester group including a succinimido group; and Y represents an acetophenone derivative, an acyl phosphine oxide derivative, a titanocene derivative, a triazine derivative, a bisimidazole derivative, an O-acyloxime derivative, a benzophenone derivative, a thioxanthone derivative, an α-diketone derivative, an anthraquinone derivative, an azo compound derivative, or a peroxide derivative, in an equivalent of 0.05 to 100 with respect to the amount by mole of the aminosilane compound employed in (a); and heating the mixture at 20 to 200° C.

10. A method according to claim 9 for producing a surface-treated colloidal silica dispersion containing silica particles having surfaces to which a functional group having a radical-generation site has been introduced, which method comprises, in (d), adding at least one condensing agent selected from the group consisting of a triazine-type condensing agent, an imidazole-type condensing agent, a phosphonium salt-type condensing agent, a carbodiimide-type condensing agent, a uronium-type condensing agent, and a succinimide-type condensing agent to a compound represented by the following formula (4):

wherein X represents a halo-carbonyl group, a carboxyl group, an aldehyde group, an isocyanate group, a thioisocyanate group, or an active ester group including a succinimido group; and Y represents an acetophenone derivative, an acyl phosphine oxide derivative, a titanocene derivative, a triazine derivative, a bisimidazole derivative, an O-acyloxime derivative, a benzophenone derivative, a thioxanthone derivative, an α-diketone derivative, an anthraquinone derivative, an azo compound derivative, or a peroxide derivative, in an equivalent of 0.01 to 100 with respect to the amount by mole of the compound (4).

11. A method for producing a surface-treated colloidal silica dispersion containing silica particles having polymer-grafted surfaces, wherein the method comprises adding a polymerizable monomer to surface-treated colloidal silica dispersion comprising silica particles having surfaces to which a functional group having a radical-generation site has been introduced and produced through a method as recited in claim 9, and performing radical polymerization via an activate energy ray or heat.

12. An aminosilane-modified colloidal silica dispersion production method according to claim 7, which method comprises:
(e) adding a non-polar solvent S2 having a dielectric constant at 20° C. of 1 or higher and lower than 15 to a colloidal silica in which silica particles are dispersed in a polar solvent S1 having a dielectric constant at 20° C. of 15 or higher and lower than 60, and the silica particles have surfaces to which a first silyl group represented by the following formula (1):

wherein $R^1$ represents a C1 to C10 substituted or non-substituted alkyl group or a phenyl group; $R^2$ represents a C1 to C4 alkyl group or a C1 to C4 alkoxyalkyl group; a is 1 to 3; a plurality of $R^1$s may be identical to or different from one another; and a plurality of $OR^2$s may be identical to or different from one another, is bound in an amount of 0.05 to 5 mmol/g with respect to the mass of silica, such that the mass ratio (S1/S2) is adjusted to 1 to 6; and subsequently, mixing the colloidal silica with an aminosilane compound represented by the following formula (3):

wherein $R^3$ represents a C1 to C4 alkyl group, a phenyl group, or a C1 to C3 alkyl group which is substituted with one or more groups selected from an amino group, an aminoalkyl group, and an alkylamino group; at least one $R^3$ is a C1 to C3 alkyl group which is substituted with any of the groups selected from an amino group, an aminoalkyl group, and an alkylamino group; $R^4$ represents a C1 to C4 alkyl group; b is 1 or 2; a plurality of $R^3$s may be identical to or different from one another; and a plurality of $OR^4$s may be identical to or different from one another, in an amount of 0.02 to 3.0 mmol/g with respect to the mass of silica;
(f) adjusting the water content of the mixture to a mole ratio of 0.4 to 5 with respect to the aminosilane compound; and
(g) thermally treating the colloidal silica dispersion obtained in (f) at 20 to 200° C.

13. A method for producing a surface-treated colloidal silica dispersion containing silica particles having surfaces to which a functional group having a radical-generation site has been introduced, wherein the method comprises: (e), (f), and (g) employed in claim 12; and subsequently:
(h) adding, to the aminosilane-modified colloidal silica dispersion obtained in (g), a compound represented by the following formula (4):

wherein X represents a halo-carbonyl group, a carboxyl group, an aldehyde group, an isocyanate group, a thioisocyanate group, or an active ester group including a succinimido group; and Y represents an acetophenone derivative, an acyl phosphine oxide derivative, a titanocene derivative, a triazine derivative, a bisimidazole derivative, an O-acyloxime derivative, a benzophenone derivative, a thioxanthone derivative, an α-diketone derivative, an anthraquinone derivative, an azo compound derivative, or a peroxide derivative, in an equivalent of 0.05 to 100 with respect to the amount by mole of the aminosilane compound employed in (e); and heating the mixture at 20 to 200° C.

14. A method according to claim 13 for producing a surface-treated colloidal silica dispersion containing silica particles having surfaces to which a functional group having a radical-generation site has been introduced, wherein the method includes, in (h), adding at least one condensing agent selected from the group consisting of a triazine-type condensing agent, an imidazole-type condensing agent, a phosphonium salt-type condensing agent, a carbodiimide-type condensing agent, a uronium-type condensing agent, and a succinimide-type condensing agent to a compound represented by the following formula (4):

$$X-Y \qquad (4)$$

wherein X represents a halo-carbonyl group, a carboxyl group, an aldehyde group, an isocyanate group, a thioisocyanate group, or an active ester group including a succinimido group; and Y represents an acetophenone derivative, an acyl phosphine oxide derivative, a titanocene derivative, a triazine derivative, a bisimidazole derivative, an O-acyloxime derivative, a benzophenone derivative, a thioxanthone derivative, an α-diketone derivative, an anthraquinone derivative, an azo compound derivative, or a peroxide derivative, in an equivalent of 0.01 to 100 with respect to the amount by mole of the compound (4).

15. A method for producing a multi-branched-polymer-modified colloidal silica dispersion, wherein the method comprises:

obtaining the aminosilane-modified colloidal silica dispersion produced by the method of claim 7;

(i) adding an α,β-unsaturated carbonyl compound to the aminosilane-modified colloidal silica dispersion, and heating the mixture at 10 to 200° C.; and (j) adding a diamine compound to the dispersion obtained in (i), and heating the mixture at 10 to 200° C.; and repeating (i) and (j) 2 to 10 times.

16. A method for producing an aminosilane-modified colloidal silica dispersion, the dispersion medium being only a polar solvent S1 having a dielectric constant at 20° C. of 15 or higher and lower than 60; wherein the method comprises:

obtaining the aminosilane-modified colloidal silica dispersion produced by the method of claim 7;

(k) heating the dispersion at 50 to 200° C. under a pressure of 10 to 760 Torr, while adding to the mixture a polar solvent S1 having a dielectric constant at 20° C. of 15 or higher and lower than 60, to thereby remove a non-polar solvent S2 having a dielectric constant at 20° C. of 1 or higher and lower than 15.

* * * * *